United States Patent [19]
Fernholz

[11] Patent Number: 5,819,238
[45] Date of Patent: Oct. 6, 1998

[54] APPARATUS AND ACCOMPANYING METHODS FOR AUTOMATICALLY MODIFYING A FINANCIAL PORTFOLIO THROUGH DYNAMIC RE-WEIGHTING BASED ON A NON-CONSTANT FUNCTION OF CURRENT CAPITALIZATION WEIGHTS

[75] Inventor: Erhard Robert Fernholz, Princeton, N.J.

[73] Assignee: Enhanced Investment Technologies, Inc., Palm Beach Gardens, Fla.

[21] Appl. No.: 764,232

[22] Filed: Dec. 13, 1996

Related U.S. Application Data

[60] Provisional application No. 60/008,698 Dec. 15, 1995, and provisional application No. 60/021,116 Jul. 3, 1996.

[51] Int. Cl. [6] .................................................. G06F 17/60
[52] U.S. Cl. ............................................................... 705/36
[58] Field of Search .................................. 705/35, 36, 37

[56] References Cited

U.S. PATENT DOCUMENTS

| | | | |
|---|---|---|---|
| 4,953,085 | 8/1990 | Atkins . | |
| 5,101,353 | 3/1992 | Lupien et al. . | |
| 5,126,936 | 6/1992 | Champion et al. . | |
| 5,132,899 | 7/1992 | Fox .......................................... | 705/36 |
| 5,148,365 | 9/1992 | Dembo ..................................... | 705/36 |
| 5,193,056 | 3/1993 | Boes ........................................ | 705/36 |
| 5,220,500 | 6/1993 | Baird et al. . | |
| 5,557,517 | 9/1996 | Daughterty, III . | |
| 5,732,397 | 3/1998 | DeTore et al. ............................ | 705/35 |
| 5,745,383 | 4/1998 | Barber ...................................... | 705/35 |

FOREIGN PATENT DOCUMENTS

| | | |
|---|---|---|
| 0401203 | 5/1989 | European Pat. Off. . |
| 0434877 | 7/1991 | European Pat. Off. . |
| 0573991 | 6/1992 | European Pat. Off. . |
| 0686926 | 12/1995 | European Pat. Off. . |

OTHER PUBLICATIONS

W. Sharpe, "Capital asset prices: a theory of market equilibrium under conditions of risk", Journal of Finance, vol. 19, 1964, pp. 425–442.

Chernoff, "GDP Weighting Gains Followers", Pensions & Investment Age, vol. 16, Iss. 25, Nov. 28, 1988, pp. 3,48.

Feinberg, "Alternative Investments Go Back To Nature", Pension World, vol. 25, Iss. 8, Aug. 1989, p. 10.

Anonymous, "Earnings Basis for Weighting Stock Portfolios", Pensions & Investments, vol. 18, Iss. 17, Aug. 6, 1990, pp. 25–26.

Allen et al., "The International Weighting Puzzle: Exploring Alternative to Capitalization", Pensions & Investments, vol. 19, Iss. 22, Oct. 14, 1991, pp. 48–49.

(List continued on next page.)

*Primary Examiner*—Eric W. Stamber
*Attorney, Agent, or Firm*—Michaelson & Wallace; Peter L. Michaelson

[57] ABSTRACT

Apparatus and methods for automatically modifying a financial portfolio having a pre-defined universe of securities, such as, e.g., an index fund, that tracks a given capitalization weighted index, through dynamic re-weighting of a position held in each such security. Specifically, in a computer system (50, 60), a target weight is accorded to each such security, relative to others in the portfolio, in proportion to a non-constant function of current capitalization weights of the securities in the index. Once these target weights are determined, then, in response to both the target weight of each such security and an actual weight, as a proportion of the portfolio, in which that security is currently held, a trade will be generated by the system in order to conform, within a predefined band, the actual weight to the target weight so as to rebalance the holdings in the portfolio. The system can selectively operate in either one of two modes: a dynamic rebalancing mode for calculating new target weights and issuing appropriate trades, or a cash investment mode for issuing one or more trade(s) to consume excess cash then held in the portfolio.

72 Claims, 20 Drawing Sheets

OTHER PUBLICATIONS

Hammond, "The Trouble With Active Managers' Benchmarks", Pensions & Investments, vol. 22, Iss. 9, May 2, 1994, p. 14.

Clarke et al., "Proper Overseas Benchmark a Critical Choice", Pensions & Investments vol. 22, Iss. 11, May 30, 1994, pp. 28–29.

R. Fernholz, "On the Diversity of Equity Markets", Enhanced Investment Technologies, Inc., ($^c$ 1995, 1996, Intech, Princeton, New Jersey).

R. Fernholz, "Leakage in Dynamic Index Performance", Enhanced Investment Technologies, Inc., ($^c$1996, Intech, Princeton, NewJersey).

R. Fernholz, "Dynamic Index Portfolios and Equity Market Stability", Enhanced Investment Technologies, Inc., ($^c$ 1995, 1996, Intech, Princeton, New Jersey).

R. Fernholz, "Dynamic Equity Markets", Enhanced Investment Technologies, Inc., ($^c$ 1996, Intech, Princeton, New Jersey).

| FIG.1A | FIG.1B |
|---|---|
| FIG.1C | FIG.1D |

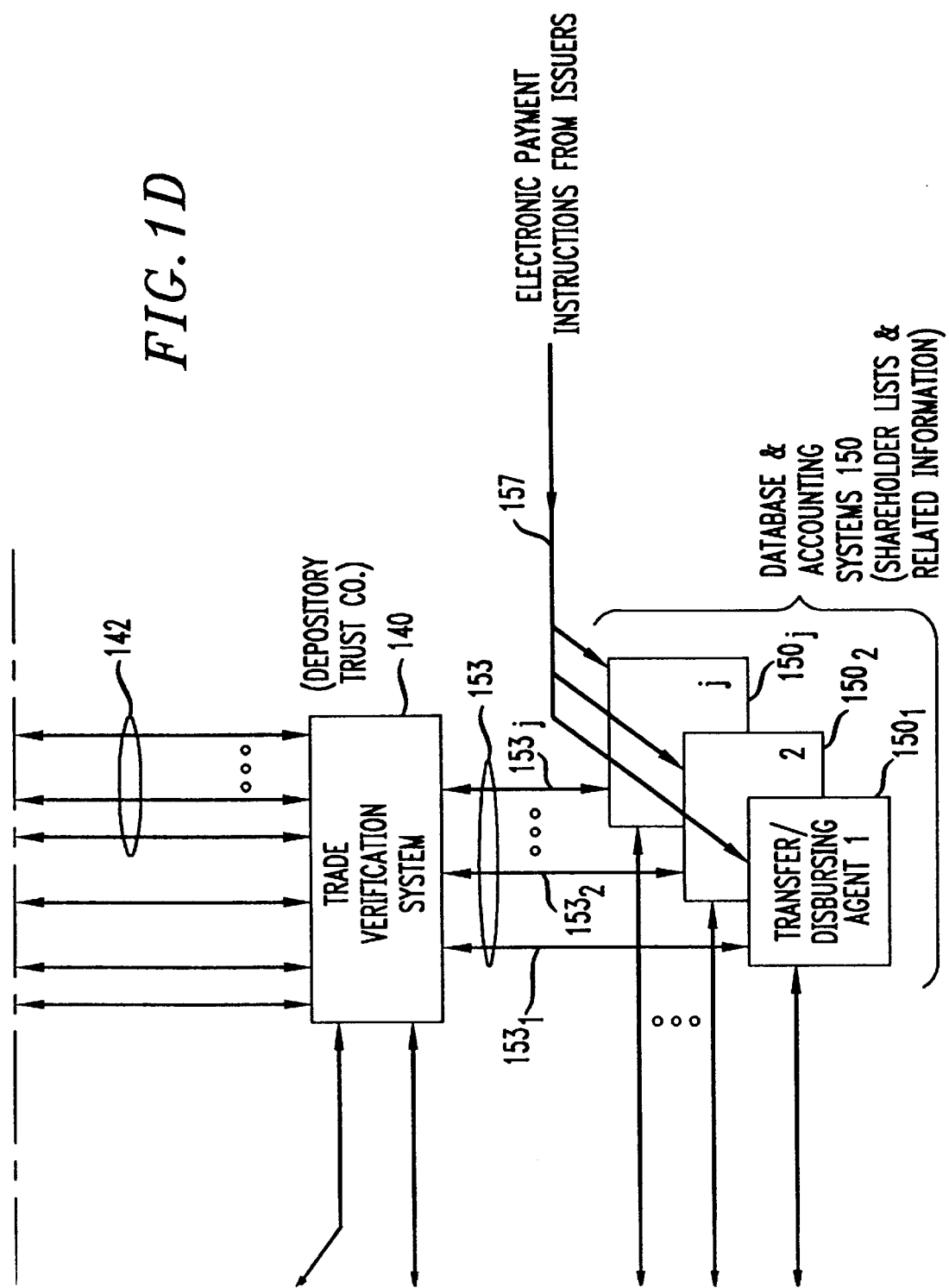

FIG. 5    PARAMETER DEFINITIONS:

510 — GLOBAL PARAMETERS:
- $W$ = MINIMUM TRADE PROPORTION
- $P$ = MINIMUM BUY PRICE
- $C$ = CASH MAINTENANCE PROPORTION
- $\tilde{C}$ = CASH INVESTMENT TRIGGER PROPORTION
- $M = \begin{cases} 1, & \text{REBALANCING MODE} \\ 0, & \text{CASH INVESTMENT MODE} \end{cases}$
- $B$ = GLOBAL STOCK TRADING BAND
- $F$ = DIVERSITY EXPONENT

520 — VARIABLES PERTAINING TO AN ACCOUNT:
- $K$ = PORTFOLIO CASH
- $V$ = PORTFOLIO VALUE
- $L$ = PORTFOLIO TRADE ROUNDING CENTER
- $D$ = EXCESS PORTFOLIO CASH

530 — VARIABLES PERTAINING TO A SECURITY:
- $P_i$ = SECURITY PRICE
- $s_i = \begin{cases} 0, & \text{IF SECURITY IS NOT IN S\&P 500} \\ \text{SHARES OUTSTANDING}, & \text{OTHERWISE} \end{cases}$

540 — VARIABLES PERTAINING TO A SECURITY WITHIN AN ACCOUNT:
- $\pi_i$ = TARGET PROPORTION
- $\omega_i$ = TEMPORARY PROPORTION
- $\rho_i$ = CURRENT PROPORTION
- $\sigma_i$ = SHARES HELD
- $\beta_i$ = TRADING BAND
- $\psi_i = \begin{cases} 1, & \text{SECURITY IS POSTED} \\ 0, & \text{OTHERWISE} \end{cases}$
- $\zeta_i = \begin{cases} 1, & \text{SECURITY HAS A TRADE PENDING} \\ 0, & \text{OTHERWISE} \end{cases}$
- $T_i = \begin{cases} 1, & \text{SECURITY IS PROSCRIBED} \\ 0, & \text{OTHERWISE} \end{cases}$
- $\theta_i$ = REMAINDER TRADE AMOUNT
- $\epsilon_i$ = SHARES TO BE TRADED
- $v_i$ = TRADING TYPE INDICATOR

FIG. 6A
DYNAMIC PORTFOLIO MANAGEMENT PROGRAM-MAIN PROGRAM

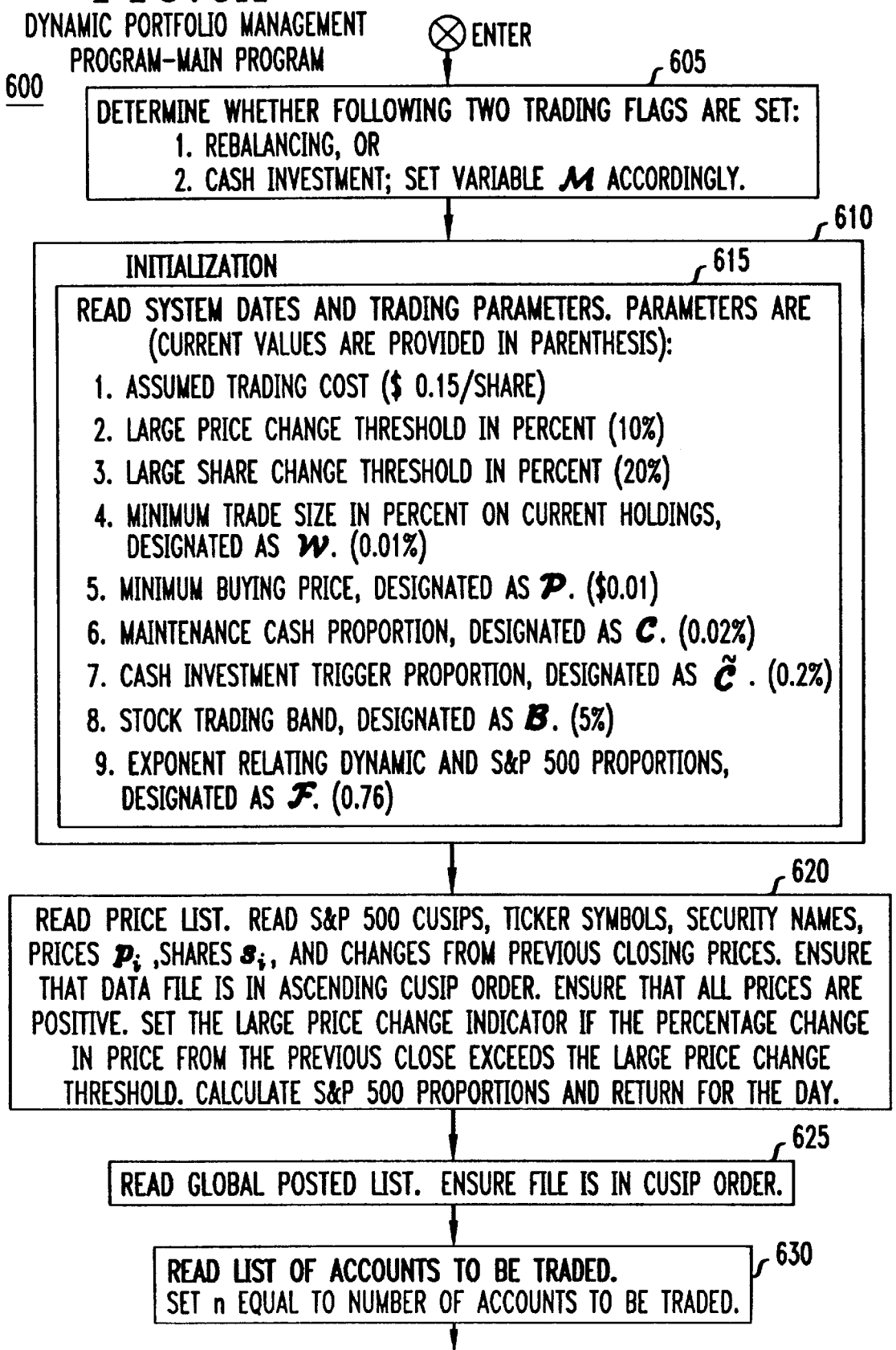

600

⊗ ENTER

605 — DETERMINE WHETHER FOLLOWING TWO TRADING FLAGS ARE SET:
1. REBALANCING, OR
2. CASH INVESTMENT; SET VARIABLE $M$ ACCORDINGLY.

610 — INITIALIZATION

615 — READ SYSTEM DATES AND TRADING PARAMETERS. PARAMETERS ARE (CURRENT VALUES ARE PROVIDED IN PARENTHESIS):
1. ASSUMED TRADING COST ($ 0.15/SHARE)
2. LARGE PRICE CHANGE THRESHOLD IN PERCENT (10%)
3. LARGE SHARE CHANGE THRESHOLD IN PERCENT (20%)
4. MINIMUM TRADE SIZE IN PERCENT ON CURRENT HOLDINGS, DESIGNATED AS $W$. (0.01%)
5. MINIMUM BUYING PRICE, DESIGNATED AS $P$. ($0.01)
6. MAINTENANCE CASH PROPORTION, DESIGNATED AS $C$. (0.02%)
7. CASH INVESTMENT TRIGGER PROPORTION, DESIGNATED AS $\tilde{C}$. (0.2%)
8. STOCK TRADING BAND, DESIGNATED AS $B$. (5%)
9. EXPONENT RELATING DYNAMIC AND S&P 500 PROPORTIONS, DESIGNATED AS $F$. (0.76)

620 — READ PRICE LIST. READ S&P 500 CUSIPS, TICKER SYMBOLS, SECURITY NAMES, PRICES $P_i$, SHARES $S_i$, AND CHANGES FROM PREVIOUS CLOSING PRICES. ENSURE THAT DATA FILE IS IN ASCENDING CUSIP ORDER. ENSURE THAT ALL PRICES ARE POSITIVE. SET THE LARGE PRICE CHANGE INDICATOR IF THE PERCENTAGE CHANGE IN PRICE FROM THE PREVIOUS CLOSE EXCEEDS THE LARGE PRICE CHANGE THRESHOLD. CALCULATE S&P 500 PROPORTIONS AND RETURN FOR THE DAY.

625 — READ GLOBAL POSTED LIST. ENSURE FILE IS IN CUSIP ORDER.

630 — READ LIST OF ACCOUNTS TO BE TRADED. SET n EQUAL TO NUMBER OF ACCOUNTS TO BE TRADED.

TARGET PROPORTION
DETERMINATION
ROUTINE
700

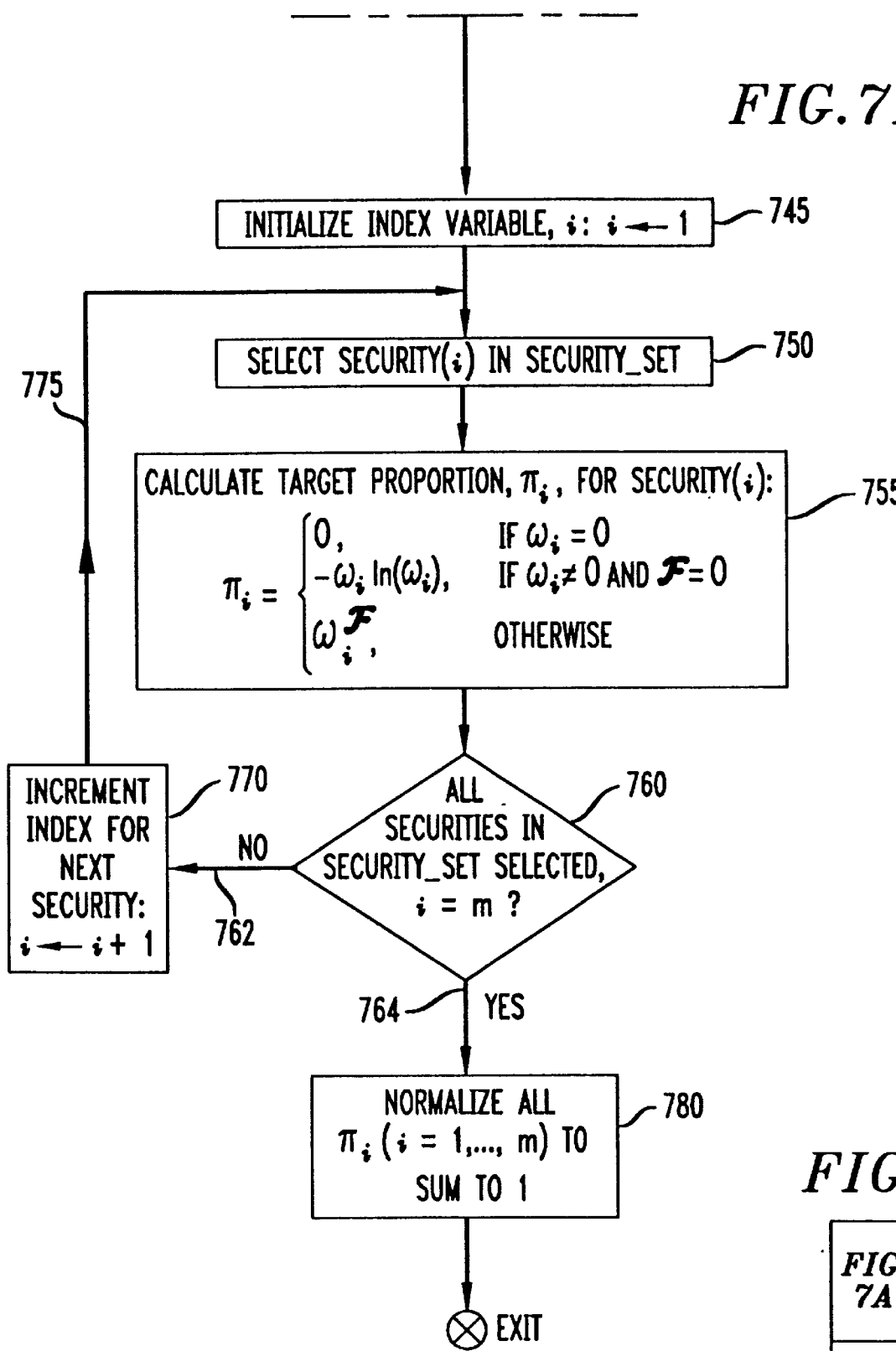
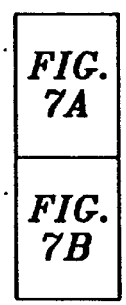
FIG. 7B
FIG. 7
| FIG. 7A |
| FIG. 7B |

FIG. 8

CURRENT PROPORTION DETERMINATION ROUTINE 800

⊗ ENTER

↓

810 — CALCULATE PORTFOLIO VALUE OF ACCOUNT(ACCOUNT_INDEX):
$$V = \sum_i \sigma_i \, p_i + K$$

↓

820 — ENSURE THAT $V$ IS POSITIVE.

↓

830 — INITIALIZE INDEX VARIABLE, $i$:
$i \leftarrow 1$

↓

840 — SELECT SECURITY($i$) IN SECURITY_SET

↓

850 — CALCULATE CURRENT PROPORTIONS OF PORTFOLIO ATTRIBUTABLE TO SECURITY($i$):
$$p_i = \sigma_i \, p_i / V$$

↓

860 — ALL SECURITIES IN SECURITY_SET SELECTED, i.e. $i = m$?

NO 863 → 870 INCREMENT INDEX FOR NEXT SECURITY: $i \leftarrow i + 1$ → (875, back to 840)

YES 867 ↓

⊗ EXIT

TRADE DETERMINATION ROUTINE 900

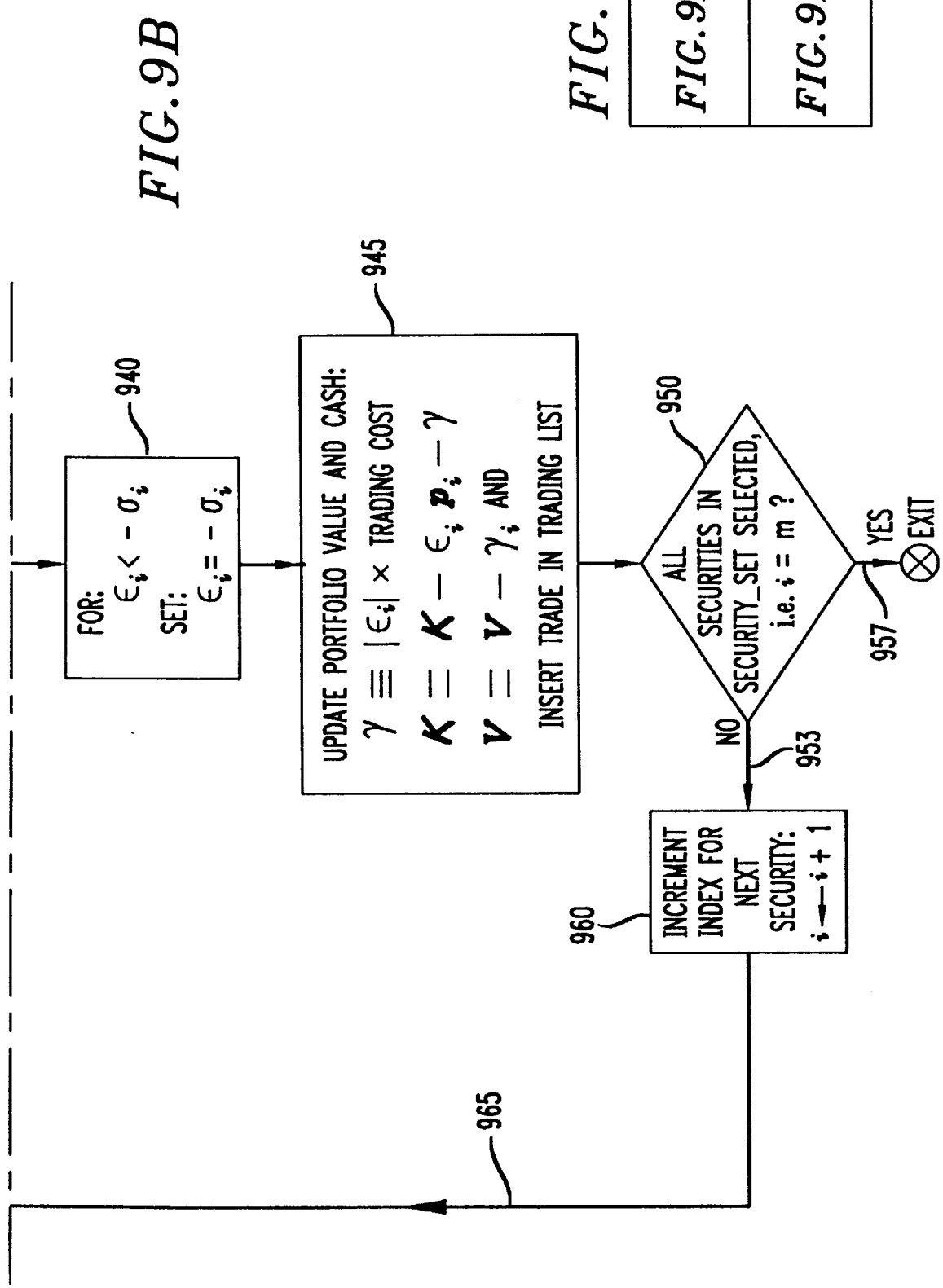

CASH CONTROL ROUTINE 1000

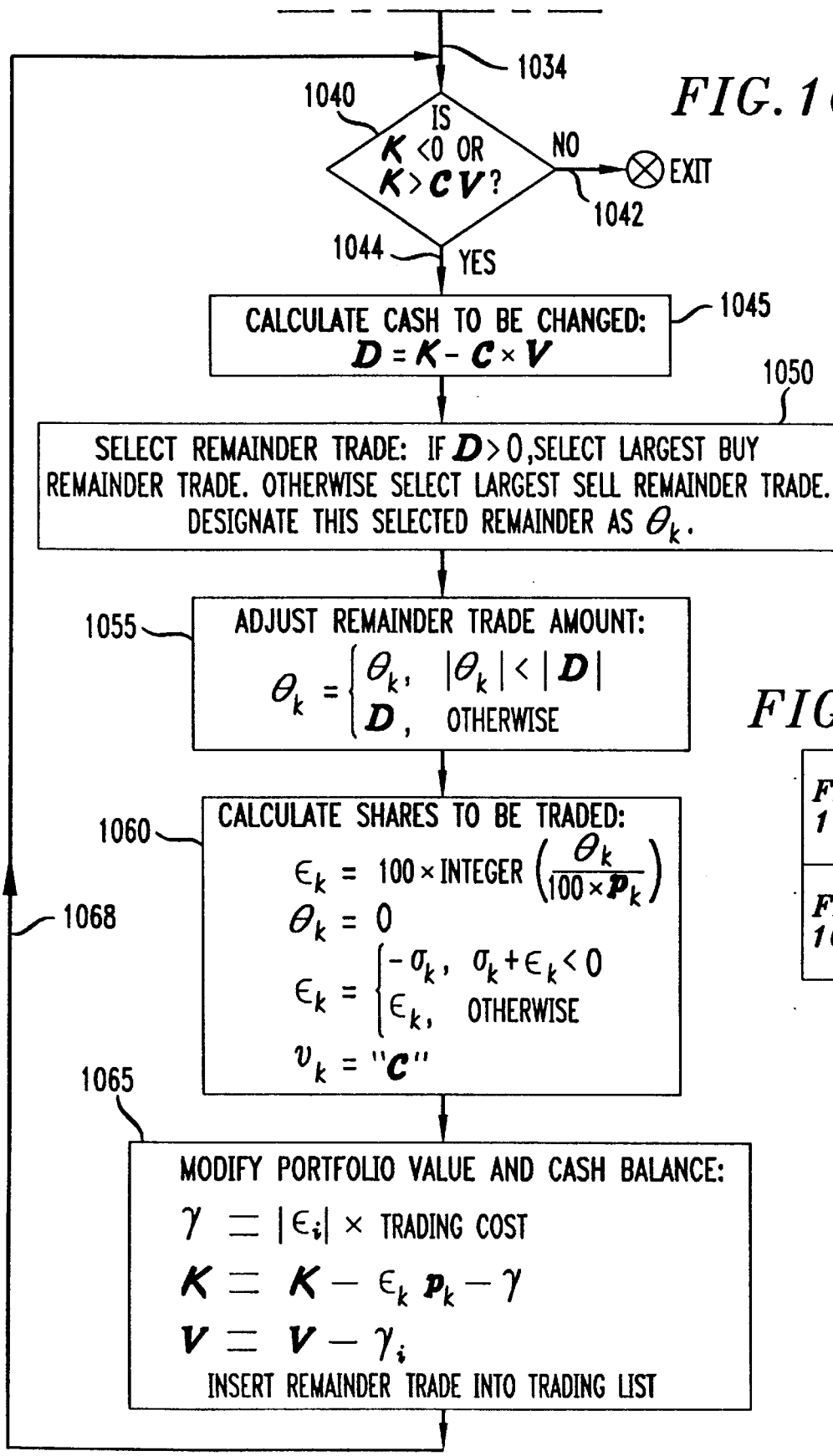

ANNUAL PERFORMANCE
(THREE INDICES)

KEY:
• DYNAMIC PORTFOLIO MANAGEMENT (SIMULATED)
□ RUSSELL 1000
× S & P 500

PERFORMANCE CHARACTERISTICS
1994-1995

| | AVERAGE ANNUAL RETURN (%) | ANNUAL STANDARD DEVIATION (%) |
|---|---|---|
| DYNAMIC PORTFOLIO MANAGEMENT (SIMULATED) | 17.19 | 13.31 |
| S&P 500 | 16.64 | 13.34 |
| RUSSELL 1000 | 16.66 | 13.82 |

APPARATUS AND ACCOMPANYING METHODS FOR AUTOMATICALLY MODIFYING A FINANCIAL PORTFOLIO THROUGH DYNAMIC RE-WEIGHTING BASED ON A NON-CONSTANT FUNCTION OF CURRENT CAPITALIZATION WEIGHTS

CLAIM TO PRIORITY

This application claims the benefit of priority under 35 USC 119 to my previously filed and co-pending United States provisional patent applications: one filed Dec. 15, 1995 and assigned Ser. No. 60/008,698, and another filed Jul. 3, 1996 and assigned Ser. No. 60/021,116, and both entitled "Automated Investment Portfolio Construction".

BACKGROUND OF THE DISCLOSURE

1. Field of the Invention

The invention relates to apparatus and methods for automatically modifying a financial portfolio having a pre-defined universe of securities, that tracks a given capitalization weighted index, through dynamic re-weighting of a position held in each such security, wherein a current weight accorded to each such security, relative to others in the portfolio, is proportional to a non-constant function of current capitalization weights of the securities in the index. The invention is particularly, though not exclusively suited, for use in managing an index fund composed of a pre-defined set of equity securities.

2. Description of the Prior Art

Currently and for the foreseeable future, tax exempt funds, such as pension fund portfolios, hold a substantial, and continually and significantly increasing amount of money diversified across various forms of investments. At the moment, tax exempt funds are estimated to have in excess of US $4 Trillion in equity assets under management of one sort or another. Of these assets, so-called "index funds" constitute one popular investment vehicle that is often used in pension fund management and currently account for approximately US $600 Billion thereof. Index funds are characterized by investing in all those securities that collectively form a pre-defined index, such as, e.g., all the different securities in the Standard & Poor's (S & P) 500 or the Russell 1000 for US equities, or in the TOPIX for Japanese equities. The attractiveness of these funds lies in their ability to generate a financial return that should track that of the corresponding indices at low cost.

Generally speaking, an index is defined by a pre-determined universe of issues which constitute that index, e.g. common stocks of 500 large corporations which trade on United States exchanges constitute the S & P 500, as well as a proportion of the index, i.e. in terms of a weighting, attributable to each different issue therein. Illustratively, the weighting for each different security in the S & P 500 index is simply the market capitalization of that security expressed as a percentage of the total market capitalization taken across all the securities then in the index. Of course, these weights continually change as share prices move which, in turn, changes market capitalization both of each individual security in the index as well as that across the entire index. Other indices, such as the Value Line index, assign different, e.g. equal, weightings to each security therein.

Index funds generally fall into two distinct categories: passive funds and enhanced funds. Passive and enhanced index funds are distinguished by their adherence, or lack thereof, to the security weightings set forth in whatever index each such fund follows.

Specifically, a passive index fund merely reflects a corresponding index of interest. Specifically, a passive index fund manager will spread total fund assets across every security in the index and, for each such security, in a proportion set by the proprietor of the index, hence identically reflecting and continually tracking, to the extent possible, the performance and composition of the index. For example, a passive S & P 500 index fund manager will invest fund assets across every one of the 500 common stocks that forms the S & P 500 index and with a weighting given by this index. As the index weightings change, typically on a daily, weekly or other regular basis, positions in the individual securities in the portfolio will either be reduced or enlarged whenever necessary to accurately reflect these changes. In addition, should a given security be eliminated from the index, as a result of e.g. insufficient market capitalization or bankruptcy of its issuer or merger of its issuer into another entity, or alternatively a new security be added to the index, due to the increased capitalization of its issuer, the fund manager will then appropriately sell or buy that security to mirror the composure and weightings then existent in the index. Of the $4 Trillion currently invested in tax exempt funds, approximately $600 Billion of that amount is invested in passive index funds.

In sharp contrast, an enhanced index fund contains positions in the securities that constitute a corresponding index of interest but the fund manager thereof replaces the passive index weighting by his(her) own weightings for each security. Risk is controlled here inasmuch as an enhanced index fund manager usually monitors a so-called "tracking error" that measures a difference between whatever financial return he(she) receives relative to that of the underlying index itself, e.g. the return of S & P 500 index for an enhanced S & P 500 index fund, and trades in a fashion that maintains this error within acceptable bounds. Enhanced index funds hold approximately $75 Billion of tax exempt assets under management.

Historically speaking, index funds are rooted in a "Capital Asset Pricing Model". For further details thereon, the reader is referred to W. Sharpe, "Capital asset prices: a theory of market equilibrium under conditions of risk", *Journal of Finance*, Vol. 19, 1964, pages 425–442. In accordance with this model, under ideal conditions, an investor in a market, seeking to maximize his expected return at a given level of risk, will hold a combination of cash and every stock available in that market, with the weighting of each such stock being proportional to its current capitalization weighting in the market. Underlying this model are two basic assumptions: (a) all investors are said to possess the same knowledge, i.e. information, and outlook, i.e. expectation, on each stock, and (b) each investor can borrow an unlimited amount of money at the US treasury bill rate. While both of these assumptions are obviously widely fallacious, index funds actually perform rather well over a reasonable period of time.

In that regard, for a moderate investment horizon of 3–5 years, index funds have proven to be attractive investment vehicles for the simple reason that these funds, ignoring their management fees but including their transaction costs, tended to perform better, i.e. have regularly generated a greater annual return with no greater risk, over this period than have most financial money managers who actively pick individual securities for investment. This effect is particularly true where substantial pension assets, such as several billion dollars are to be invested.

Given that most fund managers tend to under-perform various market indices, such as the S & P 500 index, pension plans are increasingly turning to index funds as one part of a multi-faceted strategy aimed at obtaining an increased investment return at an acceptable risk.

By their very nature, enhanced index funds require far more active and sophisticated management than do passive index funds. Security selection and weighting decisions are often the product of a highly sophisticated, continuous and complex analysis and decision-making process which is rather difficult and quite costly to implement and then execute on a routine basis—particularly considering the need for effective and close human supervision and intervention. Consequently, management fees on enhanced index funds typically amount to 30–50 or more basis points (a basis point being 0.01%—hereinafter simply "bp") of the assets of the fund against generally 5–15 bp for a passive index fund. While passive index funds tend to just mirror the return of the underlying index, enhanced index funds, because of their higher cost structures, strive to consistently outperform the index typically by 0.5%–2% per year in order to attract sufficient levels of fresh investment capital and then retain it.

Unfortunately, in practice, enhanced index funds, due to the complexities of the attendant analysis and decision-making and the monetary costs thereof, have experienced considerable difficulty in achieving the level of return necessary to attract substantial amounts of new capital over that directed to passive index funds—though no theoretical impediment to achieving such a return for an index fund appears to exist.

Given the inherent diversification, an index fund with objective simplicity, low costs, fees comparable to a passive index, and which produces a return to its investors consistently exceeding that of a major index, such as the S & P 500 index, by as little as, e.g., 40 bp per year, may attract significantly increasing pension fund investment. Thus far, such a fund does not exist.

Furthermore, over the past few decades, various securities exchanges, such as the New York Stock Exchange (NYSE), have instituted a variety of electronic and computerized networks to rapidly handle substantially increasing trading volumes, particularly from institutional traders. These systems, typified by the NYSE Direct Order Turnaround (Super DOT) system, provide mechanisms for high-volume, reduced cost electronic trading. While the NYSE possesses a trading floor manned by human trading specialists through which all NYSE trades ultimately pass, another exchange, i.e. the NASDAQ (frequently referred to as the over-the-counter (OTC) market) is solely electronic in nature. In contrast with the NYSE, the NASDAQ consists of an electronic network interconnecting, e.g., financial institutions and other exchange members, and various redundant server computers, connected to the network. Trading orders are electronically directed from workstations and internal networks situated at NASDAQ exchange members, through the NASDAQ network and are ultimately executed by the NASDAQ servers, which, upon each trade execution, returns an appropriate confirmation, via the NASDAQ network, to the associated exchange members. In addition to the electronic trading mediums provided by various exchanges, financial institutions have adopted their own computer based trading networks, e.g. so-called "crossing networks", that interface not only with those of the exchanges at which trades will be executed but also with those of other such institutions for off-exchange trading. Trading orders can also be posted by computer to various electronic bulletin boards which are regularly downloaded by financial institutions to solicit their interest and bid in any of these orders.

Moreover, financial information, particularly securities pricing, is being increasingly disseminated across an exceedingly wide geographic area in real-time electronic form. For example, this information can be obtained from, e.g.: a satellite feed; a terrestrial broadcast such as teletext or other data inserted into a broadcast television signal; data inserted into a broadcast radio signal; a dedicated computer linkage connected through the Internet or a private network to an appropriate server; or even a dial-up modem connection, established between a personal computer executing a suitable communication and/or financial program or through a dedicated terminal, and, via a publicly switched telephone network, a distant server.

In order to cost-effectively manage an index fund, real-time security price information, from whatever source is chosen, generally needs to be electronically downloaded and electronically processed with resulting trading orders then being sent, via one or more electronic avenues, for appropriate execution.

Hence, a need exists in the art for apparatus and accompanying methods that, with only a modest amount of human oversight, will effectively manage a portfolio, particularly an index fund, in a manner which is likely to consistently yield a return which sufficiently exceeds that provided by a typical passive index fund but without the complexities and costs typically associated with an enhanced index fund. Advantageously, such apparatus and methods should implement an investment vehicle which yields a return that is sufficient to garner an appreciable amount of investment capital that would otherwise flow to passive index funds. In doing so, this apparatus must operate as cost-effectively as possible by: (a) utilizing market information in electronic form, (b) processing this information electronically to generate appropriate trading orders, and (c) seamlessly integrating into the various computerized financial networks to utilize computer-based order placement and/or execution, where appropriate.

SUMMARY OF THE INVENTION

Advantageously, my present invention substantially, if not totally, remedies the deficiencies inherent in the art. Specifically, I have broadly recognized that, for a portfolio, such as an index fund, that holds a pre-defined universe of securities which collectively forms a capitalization weighted index, the portfolio can be effectively managed by dynamically re-weighting the position of each security in the portfolio in a manner proportional to a non-constant function of current capitalization weights of the securities in the index. I have found that, for appropriately selected functions, the resultant return generated by such a portfolio will consistently and reliably outperform that of the index itself.

Specifically, my inventive apparatus contains circuitry which obtains appropriate input information and an appropriately programmed computer system. The input information, which can be provided from any of a wide variety of sources, includes an enumeration of each security in the index and its shares currently outstanding, as well as current price information on each such security and its price change. The computer system, using this information as well as internally stored portfolio data, first determines a variable ("target") weighting for each of the securities in the portfolio as the non-constant function of current capitalization weights associated with the index, so as to define a set of target weights. Once all the target weights have been so determined, the computer then issues digital trading instructions, each of which represents a trade of a corresponding security, to, e.g., an electronic trading network such that current assets held in the portfolio are to be distributed, upon subsequent execution of the instructions, amongst the securities in the portfolio in proportion to and as defined by the target weights so as to dynamically rebalance the portfolio. This inventive portfolio rebalancing method is periodically repeated, such as weekly, daily or at any other such desired interval, to: analyze current changes in share price and current index composition and weightings, calculate new positions in each security held in the portfolio and issue appropriate market trade orders to appropriately update, i.e. rebalance, the portfolio holdings to reflect these new positions. As any particular security is deleted from or added to the index, the portfolio, through my inventive dynamic rebalancing process, reflects that deletion, i.e. through liquidation of any holdings in that security, or the addition, i.e. by calculating a target weighting for that security and establishing a holding therein once this target weighting reaches a sufficient, though, e.g., relatively low, level.

As a feature, my inventive apparatus, particularly the computer system therein, can assume either of two pre-defined operating modes: a rebalancing mode and a "cash investment" mode. Through the rebalancing mode, weights of each security in the portfolio are re-calculated and the portfolio holdings dynamically rebalanced with resulting issuance of appropriate market orders. Through the cash investment mode, transactions, e.g. security purchases, are successively generated, to the extent necessary, to consume excess cash (e.g. large cash inflows) in the portfolio that may have arisen as a result of recent dividend payment(s) and/or security sales that occurred due to deletion from the index. Through use of the cash investment mode, a cash balance in the portfolio remains within a relatively small pre-defined range with the remaining assets in the portfolio being invested in securities.

As a further feature, my inventive apparatus permits a user to proscribe, for whatever reason, any security in the index from being traded in the portfolio. As a result, portfolio assets will be allocated to and dynamically rebalanced among the remaining securities currently in the index, i.e. those for which trading is permitted.

BRIEF DESCRIPTION OF THE DRAWINGS

The teachings of the present invention can be readily understood by considering the following detailed description in conjunction with the accompanying drawings, in which:

FIG. 1 depicts the correct alignment of the drawing sheets for FIGS. 1A–1D;

FIGS. 1A–1D collectively depict large scale, though simplified, security trading system 5 incorporating my inventive dynamic portfolio management system 65;

FIG. 5 depicts definitions of various variables used in conjunction with my inventive Dynamic Portfolio Management Program 330 shown in FIG. 3;

FIG. 7 depicts the correct alignment of the drawing sheets for FIGS. 7A and 7B;

FIGS. 7A and 7B collectively depict a flowchart of Target Proportion Determination routine 700 that is executed by Main Program 600 shown in FIGS. 6A–6C;

FIG. 8 depicts a flowchart of Current Proportion Determination routine 800 that is also executed by Main Program 600 shown in FIGS. 6A–6C;

FIG. 9 depicts the correct alignment of the drawing sheets for FIGS. 9A and 9B;

FIGS. 9A and 9B collectively depict a flowchart of Trade Determination routine 900 that is executed by Main Program 600 shown in FIGS. 6A–6C;

FIG. 10 depicts the correct alignment of the drawing sheets for FIGS. 10A and 10B;

FIGS. 10A and 10B collectively depict a flowchart of Cash Control routine 1000 that is executed by Main Program 600 shown in FIGS. 6A–6C;

To facilitate understanding, identical reference numerals have been used, where possible, to designate identical elements that are common to two or more of the figures.

DETAILED DESCRIPTION

After considering the following description, those skilled in the art will clearly realize that the teachings of my invention can be readily utilized to manage an index fund based on any capitalization weighted equity index—whether national or international in nature. Through use of my inventive teachings, weights of each individual security in that fund is determined as being proportional to a non-constant function of current market capitalization weights of all the individual securities that form the index. Examples of capitalization weighted indices, on a national basis, are the Standard & Poor's (S & P) 500, the Russell 1000, the TOPIX in Japan, the Financial Times Stock Exchange 100 (FTSE) in the United Kingdom and the DAX index in Germany, and on an international basis, the Morgan Stanley Capital International (MSCI) EAFE (Europe, Australia, Far East) index. To simplify the following discussion and facilitate reader understanding, I will describe my present invention in the context of use with illustratively the S & P 500 index. In addition, since my invention can effectively manage not only shares of common stock in an index fund but also any financial instrument that has a value related to common stock, such as, e.g., derivatives, options, swaps, futures and/or any combination thereof, the term "security" as used hereinafter is defined to collectively encompass common stock and any such financial instrument.

A. Hardware Hierarchy

Figure 1A:
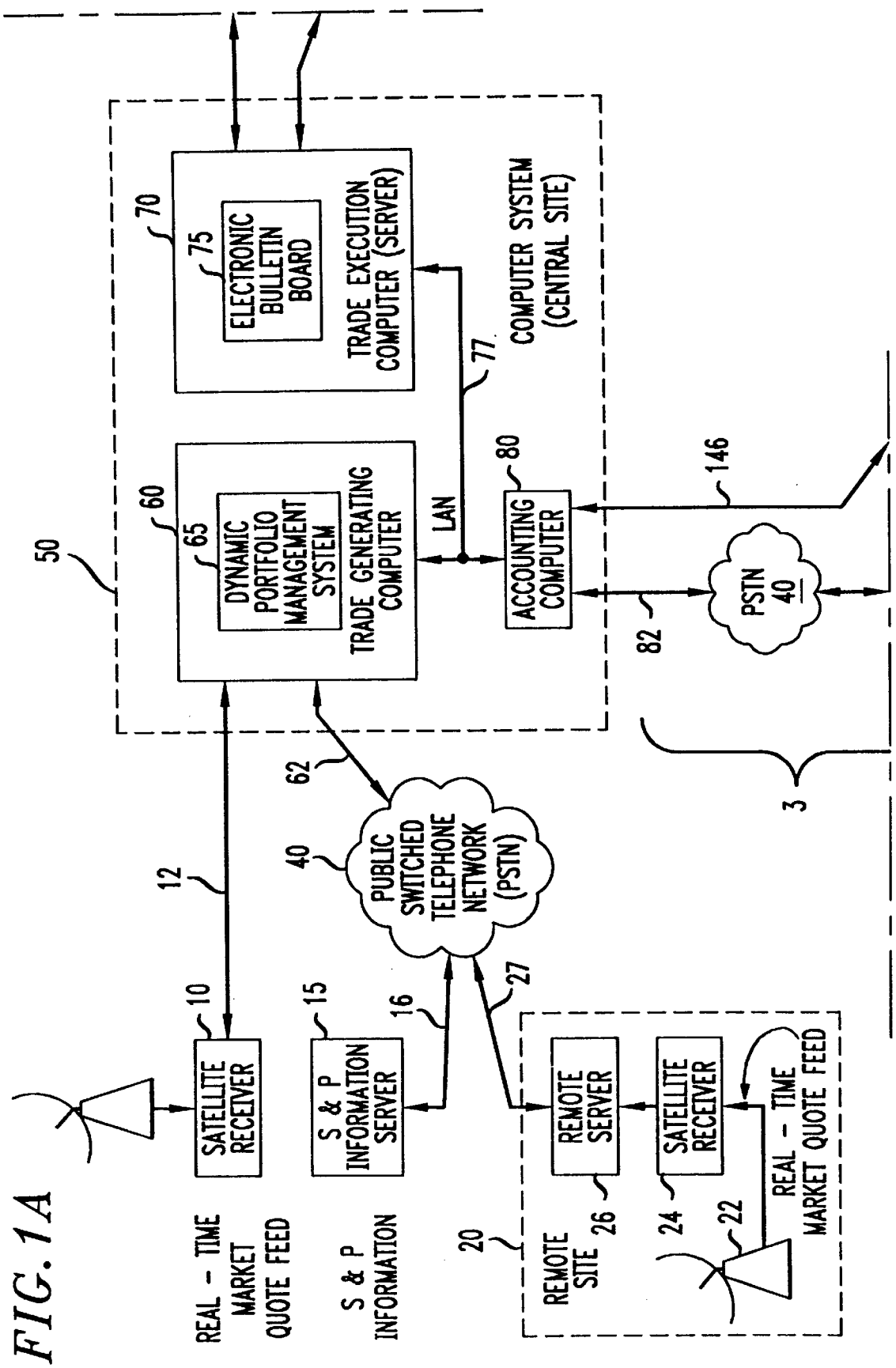
Figure 1B:
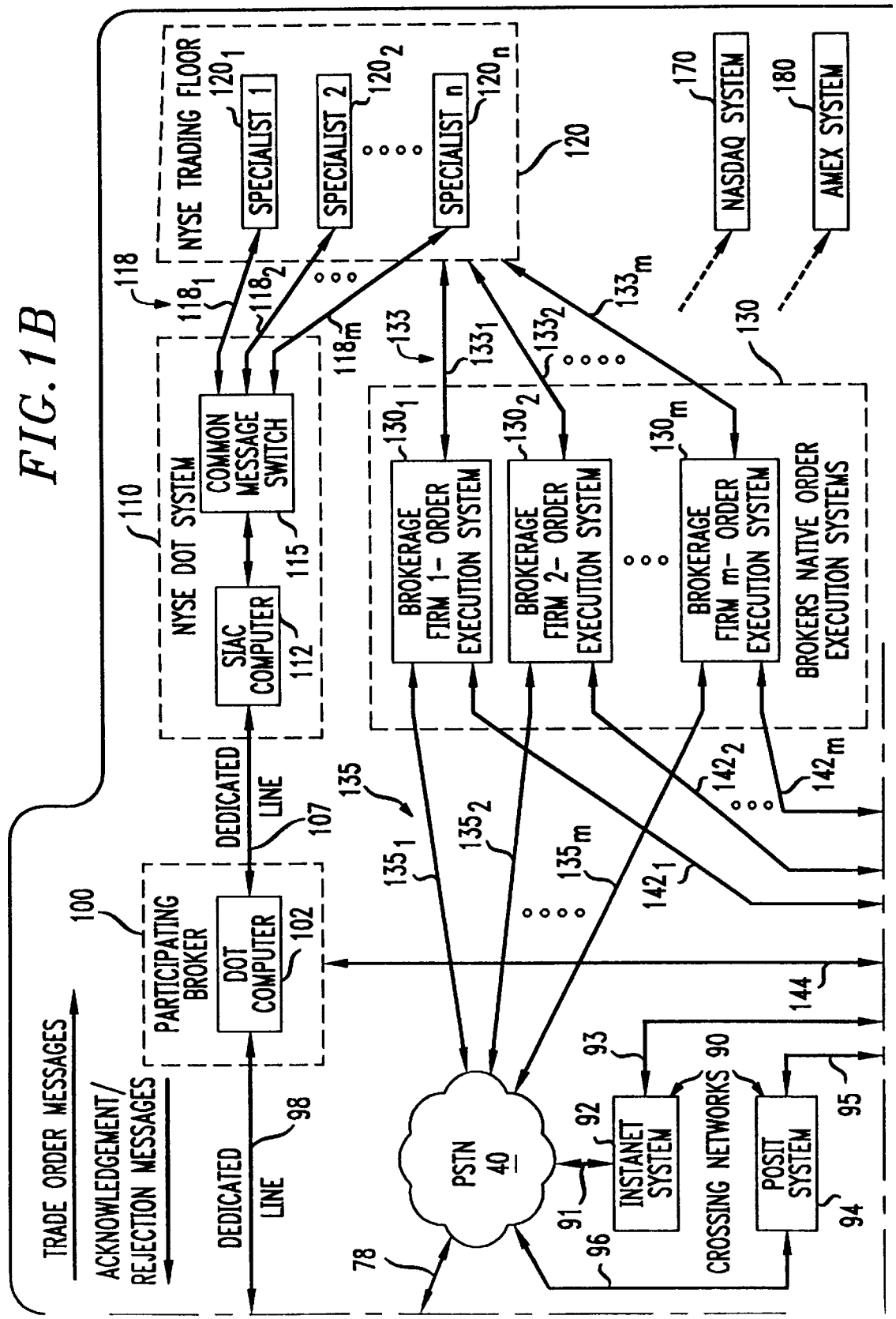
Figures 1, 1C:
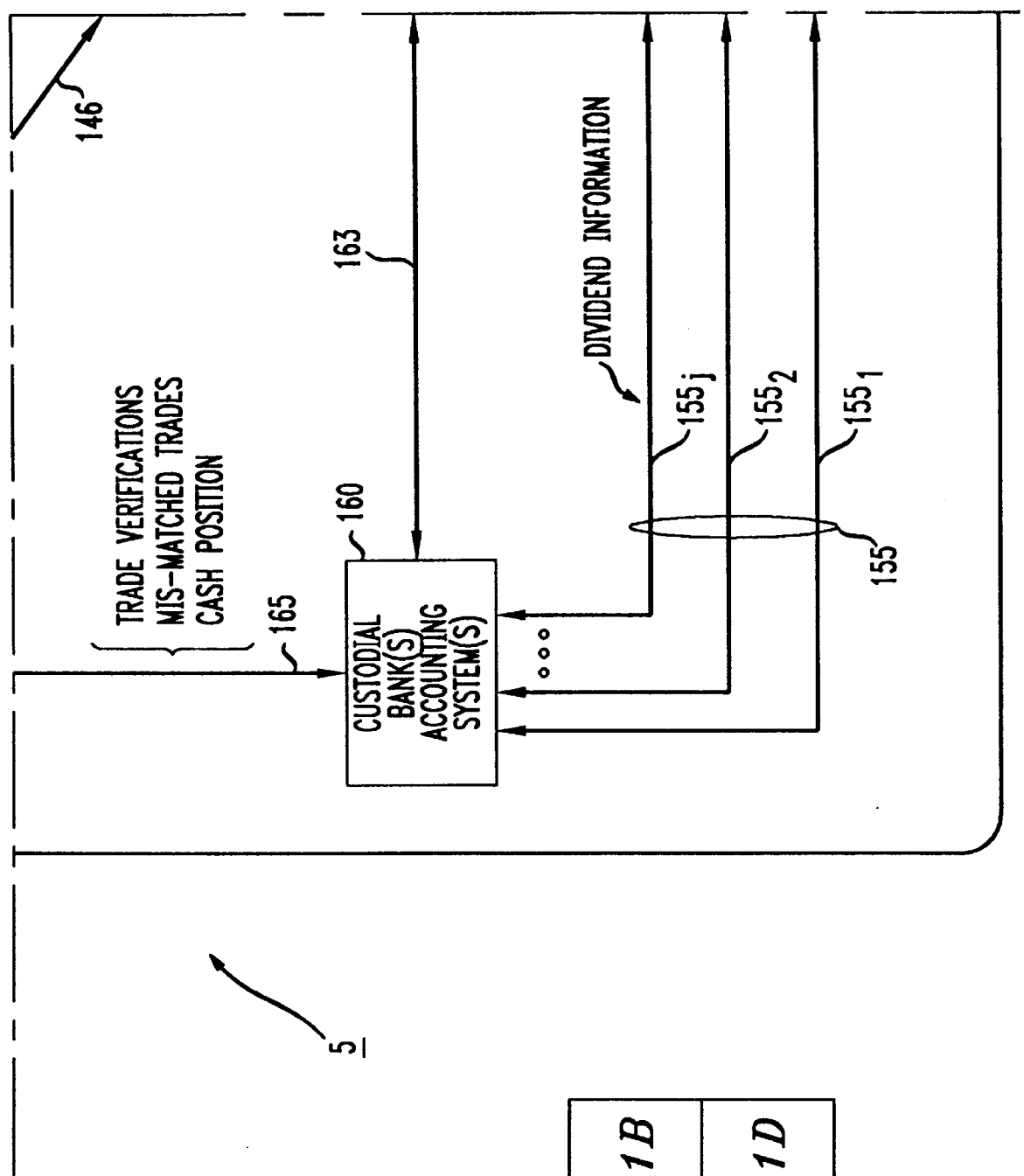

A large scale, though simplified, security trading system 5 incorporating my inventive dynamic portfolio management system 65 is collectively depicted in FIGS. 1A–1D; the correct alignment of the drawing sheets for these figures is depicted in FIG. 1. My inventive management system can readily function to manage a portfolio of securities on any exchange(s) and even a portfolio that extends over multiple exchanges, e.g., securities on the S & P 500 index can be found on the New York Stock Exchange (NYSE), NASDAQ and American exchanges. To simplify the figures and the ensuing discussion, I will illustrate and discuss my invention in the context of use with securities traded on the NYSE.

Within system 5, Dynamic Portfolio Management system 65 manages an index fund in accordance with my inventive teachings. System 65 executes within trade generating trade generating computer 60 located within computer system 50, which is situated at, e.g., a central site. Computer 60 receives input information from a number of sources and, through my inventive management process implemented in software and discussed in considerable detail below in conjunction with FIGS. 5–10B, generates trade orders as a result to electronic trading network 3. This network provides a number of avenues through which trades can be executed. As used hereinafter, a "trade order" is defined to be a combined list of buy and sell orders for a number of securities. For execution, such an order is parsed into a "trade", either a buy or sell, of each individual security in the order.

As input, system 65 obtains share prices, share price changes and S & P 500 information, specifically those securities that form the S & P 500 index and their shares outstanding. Current share prices and changes in these prices are obtained from, e.g., a terrestrially broadcast satellite distributed service. In that regard, satellite receiver 10, via satellite antenna 7, receives appropriate broadcast (transmitted) signals, demodulates the received signals, extracts the received data therefrom and converts the data into a serial digital data stream. This stream is directly applied, via line 12, to an input of trade generating computer 60. Of course, this market information can be obtained, via transmission, from a wide variety of other sources, such as a terrestrial broadcast such as teletext or other data inserted into a broadcast television signal; data inserted into a broadcast radio signal; a dedicated computer linkage connected through the Internet or a private network to an appropriate server; or even a dial-up modem connection, established between trade generating computer 60, and, via publicly switched telephone network (PSTN) 40, a distant server (not specifically shown). In addition, computer 60 accesses S & P 500 information by establishing a modem link, via telephone line 66, through PSTN 40 and telephone line 16, to S & P Information server 15 (which is typically a networked data server). In response to a query from computer 60, S & P information server 15 transmits, as another digital data stream, current S & P 500 information, specifically the constituent securities that currently form the S & P 500 index along with a current number of shares outstanding for each such security. In the event of a failure in, e.g., antenna 7 or receiver 10, current share price and price change data can alternatively be obtained through a modem connection established, via PSTN 40 and telephone lines 66 and 27, between computer 60 and remote site 20. This site contains satellite antenna 22 which feeds satellite receiver 24, both of which are either identical or sufficiently similar to antenna 7 and receiver 10, to provide the same digital data stream that would appear on lead 12. The output of receiver 24 is applied to remote server 26 for packetization and communication, over PSTN 40, to computer 60. PSTN 40, though shown as three distinct network entities in FIGS. 1A–1D to simplify understanding, is actually a single unitary network.

Though specific input modalities have been described above, input data can be supplied to computer 60 in any electronic form or in any other form that through appropriate circuitry is converted into suitable digital form for use by computer 60. This circuitry which could include, e.g., a computer input device such as a keyboard and/or mouse (as shown in, e.g., FIG. 2 and discussed below) would be connected to this computer.

As discussed below, computer 60 internally stores current information regarding the portfolio(s) being managed, its cash position and appropriate parameter values. Once all the required input information is received, inventive management system 65, in the inventive manner discussed in detail below, iterates through all the securities in the S & P 500 index to calculate a new weighting, as a percentage of the portfolio, of that security.

Apart from computer 60, computer system 50 also contains accounting computer 80 and trade execution computer (server) 70, both of which are interconnected, with computer 60 through local area network (LAN) 77.

Each resulting trade order, generated by system 65, is analyzed to determine, based on, inter alia, the size of the trade, the most cost-effective and suitable avenue through which the trade order can be executed. These avenues include: posting, as agency trades, on an electronic bulletin board for accessing and execution by a selected broker; through the NYSE Super DOT (Direct Order Turnaround) system; direct placement, as a principal trade with a broker; through a crossing network for off-exchange trading through various automated trading systems, such as "Instanet" and "POSIT" systems. Other than off-exchange trading, all other on-exchange trades involving NYSE securities pass through the NYSE and as such are ultimately routed, via a broker in the first instance—typically by an order execution system therein, to a corresponding human being, i.e. a so-called "floor specialist" on the exchange.

In particular, once system 65 generates a list of trades to be made, computer 60, through execution of appropriate conventional software, prints a list of appropriate trade orders as a so-called "trade sheet". These trades are also transmitted, as a file and via LAN 77, to computer 70. A human trading analyst, interacting with computer 70, analyzes each proposed trade generated by system 65, both to detect and prevent any clearly erroneous trade orders from being placed for execution as well as to properly place correct trade orders with appropriate trading avenues available through electronic trading network 3. Once this analyst has selected an appropriate avenue for each such order and has signified his(her) selection to trade execution computer 70, this computer then appropriately formats the trade order to match input requirements of the selected avenue and then transmits the formatted trade order to that avenue for subsequent execution.

Trade generating computer 70 maintains electronic bulletin board 75, which is conventional in nature, to which trade orders can be posted as so-called "agency trades" and subsequently accessed by a broker designated by the analyst. Each broker, that can be designated as an agent broker, is assigned a different page on the bulletin board through which that broker can down-load and up-load files from and to the bulletin board. Should the analyst select the "agency trade" avenue for any given trade order, computer 70 merely posts a computer file containing that trade order onto the bulletin board for the particular broker designated by the agent and specifically onto the page for that particular broker. This designated broker, through its order execution system, can establish a telephonic connection to the computer 70 and download the order file, from its page on the bulletin board, for subsequent execution. Specifically, each broker, that can be designated as an agent broker, has a computer based order execution system, which are collectively depicted as order execution systems 130 formed of individual order execution systems $130_1$, for firm 1, $130_2$ for firm 2, . . . $130_m$ for firm m. Each of these order execution systems, either under manual instruction or automatically, can establish a modem connection, via lines 135 (formed of lines $135_1$, $135_2$, . . . , $135_m$ connecting execution systems $130_1$, $130_2$, . . . , $130_m$, respectively), via PSTN 40 and telephone line 78, to trade execution computer 70. Through this modem connection, any of these or more of these brokerage firms can download any trade order file that has been posted to its page on the electronic bulletin board 75. Once such a file has been downloaded into the appropriate order execution system at the designated brokerage firm, the order is suitably executed. Once the designated brokerage firm has executed a trade order, that brokerage firm uploads an appropriate confirmation message, again as a computer file, onto the bulletin board to confirm execution of the trade order. This confirmation message is downloaded, in turn, by trade execution system 70 for review and later reconciliation, by accounting computer 80, against issued orders.

Alternatively, trade orders can also be placed through the NYSE Super DOT system. This avenue provides cost-effective execution for relatively small blocks of shares, but only for those securities that trade on the NYSE. If this avenue is selected by the analyst for a given trade order, trade execution computer 70 appropriately converts the trade order into an appropriate format required for DOT execution and then routes the order so formatted, as a message, to NYSE DOT System 110 for execution. To do so, computer 70 establishes a modem connection, via dedicated line 98, to DOT computer 102 at a brokerage firm, here firm 100, that participates in the Super DOT system. Though, for ease of understanding and discussion, DOT computer 102 is shown separate from any of brokerage order execution systems 130, in practice, this DOT computer can be implemented as part of any of these order execution systems. Once this order is electronically transmitted, as a message, to DOT computer 102, this computer, in turn, electronically transmits that order, via dedicated line 107, to Super DOT system 110 itself. Within system 110, the order is first routed to SIAC (Securities Industry Automation Corporation) computer 112 which, in response thereto, either accepts or rejects the order. Based on whether the order is accepted or rejected (typically because a security in the order does not trade on the NYSE) by the Super DOT system, SIAC computer 112 generates a suitable acknowledgment or rejection message, and transmits that message back to DOT computer 102 at participating broker 100. This computer, in turn, transmits this message back through dedicated line 98 to trade execution computer 70 for subsequent use thereat. For those orders that are accepted, computer 112 parses the trade order into an appropriate buy or sell order for each different security listed therein and generates a suitable transaction (i.e. buy or sell) message for each such different security. Computer 112 then routes these messages to common message switch 115, which, in turn, routes each such message to an appropriate station, on a trading floor of the NYSE, which is manned by a "floor specialist" who makes and manages a market in the corresponding security. Eligible trades are matched and executed by the specialists in accordance with NYSE rules. All orders, whether through the Super DOT system or other on-exchange avenue(s), for any security traded on the NYSE are ultimately routed through a floor specialist for that security. Inasmuch as the NYSE utilizes a significant number of specialists, some of whom make and manage markets in just one or more than one traded security, these specialists are denoted as specialists 120 with individual floor specialists $120_1$, $120_2$, . . . , $120_n$. The stations (though not specifically shown) utilized by specialists 120 are connected to common message switch 115 through lines 118, specifically lines $118_1$, $118_2$, . . . , $118_n$ for specialists $120_1$, $120_2$, . . . , $120_n$, respectively. Orders for those specific securities that have formed part of a trade order but could not be traded through the Super DOT system are executed by participating broker 100. For each of these orders, broker 100 generates an appropriate confirmation message and routes that message back, via dedicated line 98, to trade execution computer 70 for subsequent reconciliation by accounting computer 80.

Apart from use of the bulletin board and Super DOT trading avenues, trade orders can be placed directly with a given brokerage firm which, in this case, acts as a principal. This avenue, referred to as a "principal trade", is generally selected by the analyst for trading larger blocks of shares than through either bulletin board or Super DOT system. Once the analyst has selected a principal trade for a given trade order, computer 70 establishes a modem connection, via line 78 and PSTN 40 and lines 135, to a desired brokerage firm. Once this connection is so established, a conventional so-called "trade statistics" package is transmitted, as, e.g., a message, directly by computer 70 into the order execution system at that brokerage firm. Such a package is directly transmitted, in this fashion, to several different brokerage firms for competitive bidding thereamong. Once each of the brokerage firms receives the package, an appropriate employee(s) thereat analyzes the package and, if the brokerage firm is interested in executing the package, telephones a voice message to the analyst with its single bid, i.e. on a total cost basis, for handling the complete package. The analyst then appropriately reviews and analyzes these bids, selects a winning bid and so notifies the associated "winning" brokerage firm usually by telephone. Thereafter, the analyst posts a file containing all the actual individual trade orders that are to be executed, and which the statistics package represents, onto the page of the electronic bulletin board for the winning broker. That broker, through its order execution system, retrieves this file and then executes, to the extent it itself can, all the individual orders listed therein. Those individual orders which that brokerage firm can not fully execute internally, for whatever reason, are executed by that broker through alternate avenues. While the market is open, these alternate avenues for such an order include, e.g., routing that order to the station of the floor trader at NYSE trading floor for that brokerage firm who then, in turn, presents the order for each security being traded to the floor specialist for that security in an attempt to match the trade with an opposite party and hence execute the trade. As such, the order execution systems at the brokerage firms are connected, via collectively lines 133, to the NYSE trading floor, with specifically order execution systems $130_1$, $130_2$, . . . , $130_m$ connected by lines $133_1, 133_2, \ldots, 133_m$ to appropriate trading stations located on the trading floor. Once the brokerage firm executes the trade order, that firm posts a file, to electronic bulletin board 75, which specifies those individual trades within the trade order that have been executed. This file is subsequently accessed, from bulletin board 75 and via LAN 77, by accounting computer 80 for subsequent reconciliation.

A further trading avenue involves so-called off-exchange trading. This avenue utilizes so-called crossing networks 90, of which Instanet system 92 and POSIT system 94, are two examples of such networks. Each of these networks receives buy and sell orders electronically transmitted directly from interested parties who are connected to that network, matches the buy and sell orders for each security at each different price level and executes the orders thereamong and returns appropriate confirmation messages. Generally, this avenue provides cost-effective trading for relatively small blocks of shares. These systems, which by-pass any exchange, can accommodate nearly any security. If this avenue is selected by the analyst, computer 70 establishes a modem connection, via line 78 and PSTN 40, to the selected crossing network, such as through line 91 to Instanet system 92 or via line 96 to POSIT system 94. Once this connection is established, computer 70 transmits a properly formatted message for each security to be traded which specifies, inter alia, the name of the security; the type of trade sought, i.e. buy or sell; the number of shares involved; and the price at which the trade is to be executed. System 92 or 94, depending upon which is used for a given trade, will issue and transmit a message back through PSTN 40 to computer 70 confirming which trades have been executed, and after a trade has been pending for a given amount of time, which trades have not been executed. Trade confirmation messages are routed by computer 70 to trade generating computer 60 to expeditiously update the data, specifically the current portfolio holdings, locally stored therein. In conjunction with appropriate instructions issued by the analyst, those trades, that have not been executed by the corresponding crossing network to which that trade has been posted, are re-formatted by computer 70 and posted as a trade order to bulletin board 75 for execution as an agency trade.

Once all trades, for a given portfolio rebalancing operation, have been executed during a given trading session, by whatever avenue(s) are selected, these trades are automatically verified, typically after the markets have closed for that session. To verify trades, trade confirmations are also sent by each of the brokerage firms involved as well as the off-exchange trading systems to trade verification system 140 (which executes at Depository Trust Corporation). System 140 matches each side of a trade, either the buy or sell, with the other side, and, in so doing, flags all mismatched trades for subsequent resolution by the party(ies) involved. System 140 then generates appropriate electronic reports. Such a report, for each different portfolio managed by system 65, is electronically sent, via line 146, directly to accounting computer 80 for use during subsequent account reconciliation.

In particular, to verify trades, system 140 is connected, via lines 93, 95, 144 and 142 (formed of individual lines $142_1, 142_2, \ldots, 142_m$), to Instanet system 92, POSIT system 94, participating broker 100, and brokerage native order execution systems 130 (specifically order execution systems $130_1, 130_2, \ldots, 130_m$), respectively.

For all verified trades, system 140 also supplies, typically on a batch basis for all trades that occurred during an immediately prior market session, appropriate transaction information to appropriate transfer/disbursing agents, and specifically to database and accounting systems 150 thereat. This information permits these agents to update their shareholder records to properly reflect changes in share ownership for each of their client organizations that occurred during this prior market session. Inasmuch as different issuers utilize different transfer/disbursing agents, trade verification system 140 routes cleared trade information, via lines 153 and specifically lines $153_1, 153_2, \ldots, 153_j$, for each security to the appropriate database and accounting system $150_1, 150_2, \ldots, 150_j$ at the transfer/disbursing agents for that particular security. For those securities that pay a dividend, each of the transfer/disbursing agents, specifically database and accounting systems 150 thereat and in response to electronic payment instructions received over lines 157, disburses dividend payments to the appropriate shareholder accounts. Inasmuch as custodial bank 150 holds all securities and cash, typically in electronic form, in each portfolio being dynamically managed by system 65, database and accounting systems 150 provide messages containing dividend payment information, via lines 155, specifically lines $155_1, 155_2, \ldots, 155_j$ from database and accounting systems $150_1, 150_2, \ldots, 150_j$, to custodial bank 160. With this information, custodial bank 160 updates the cash balance in each such portfolio to reflect the payment of dividends.

Furthermore, accounting system 80 verifies trades in the portfolio based on confirmation messages trade execution computer 70 has received during the immediately prior market session. System 80 then transmits, via lines 82 and 165 and PSTN 40, a file, containing information specifying verified trade executions, to custodial bank accounting system 160. System 160, based on the file received from accounting system 80 and trade information independently received from trade verification system 140 via dedicated line 163, compares this information to properly corroborate the trades and detect any mis-matched trades.

A file containing fully verified trades, mis-matched trade information and current cash balances, is provided by custodial bank accounting system 160, via a modem connection through lines 165 and 82 and PSTN 40, back to accounting system 80. This file is used by accounting system 80 to: (a) update the current portfolio holdings to reflect matched trades; and (b) initiate, with appropriate human intervention, a resolution of each mis-matched trade. Updated portfolio information, specifically all current stock positions and cash balance, is then stored within trade generating computer, specifically dynamic portfolio management system 65 thereat, for use during the next successive dynamic portfolio rebalancing operation.

Once trades have been verified and mis-matched trades resolved, to the extent possible, custodial bank accounting system 160 establishes a direct connection, via line 163, to trade verification system 140 to settle the matched trades by authorizing appropriate transfer transactions in the accounts of the associated transacting parties. Though only one custodial bank accounting system 160 is specifically shown, system 65 can dynamically manage several different portfolios, each being held by a different custodial bank. In that case, database and accounting systems 150 would route appropriate dividend information to each of the custodial banks reflective of their current holdings, with each of these custodial banks separately clearing trades, that involve its holdings, through trade verification system 140.

For simplicity, I have intentionally omitted details of the computerized order entry and trading mechanisms used on all exchanges other than the NYSE, and have very generally represented the trading systems for the NASDAQ and American exchanges, as NASDAQ system 170 and AMEX system 180, respectively. The omitted details, which are all conventional, and their proper integration into system 5 will be readily apparent to anyone skilled in the art.

Figure 2:
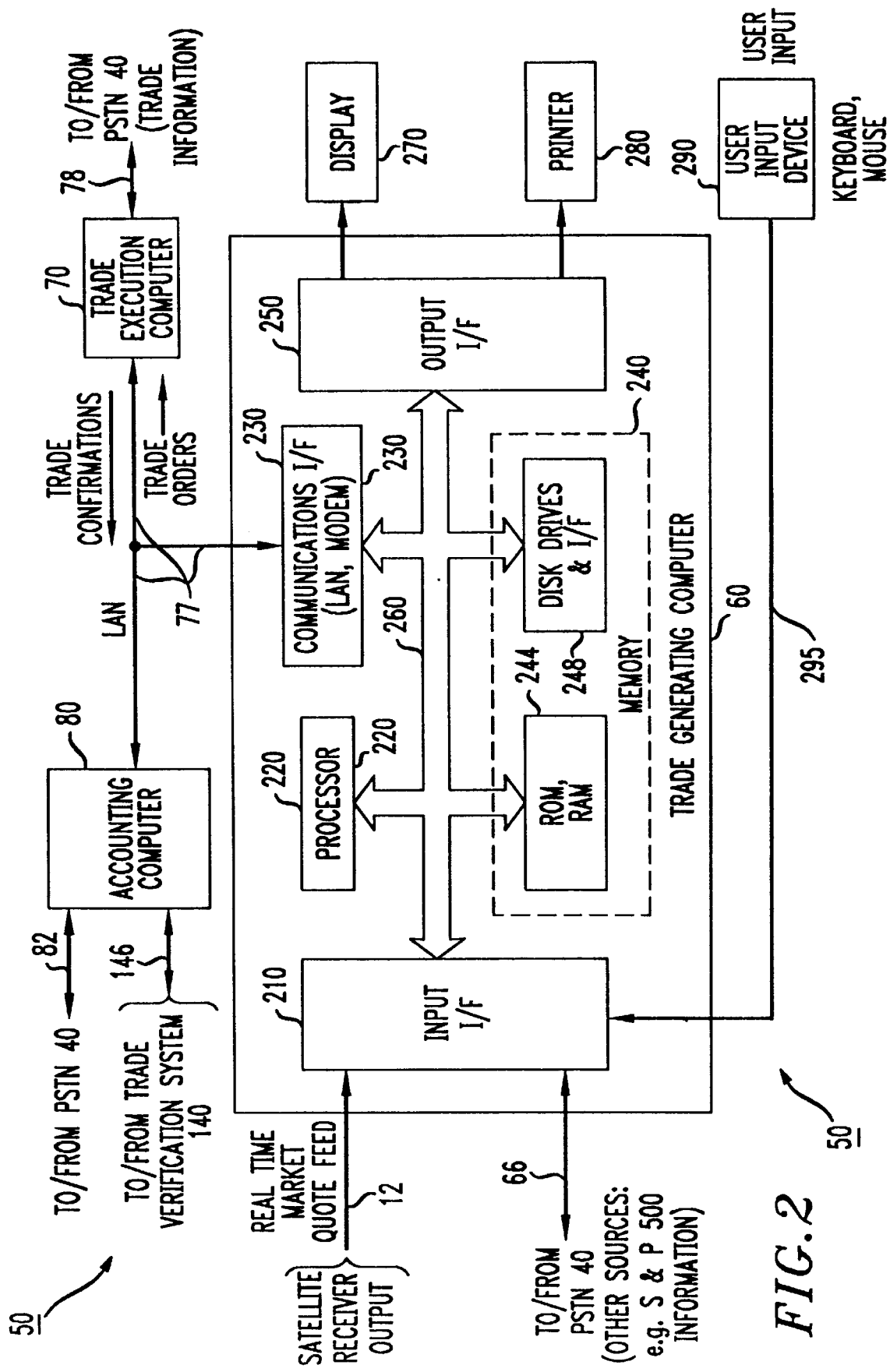
FIG. 2 depicts a high-level block diagram of the hardware components implementing computer system 50 and particularly trade generating computer 60 therein, as shown in FIGS. 1A–1D.

FIG. 2 depicts a high-level block diagram of the hardware components that implement computer system 50 and particularly trade generating computer 60 therein, as shown in FIGS. 1A–1D. As shown in FIG. 2, system 50 contains trade generating computer 60—which directly implements my present invention, trade execution computer 70 and accounting computer 80. Inasmuch as trade execution computer 70 and accounting computer 80 have already been discussed in sufficient detail for purposes of the present invention, I will omit any further discussion of these two computers and turn to trade generating computer 60.

Figure 3:
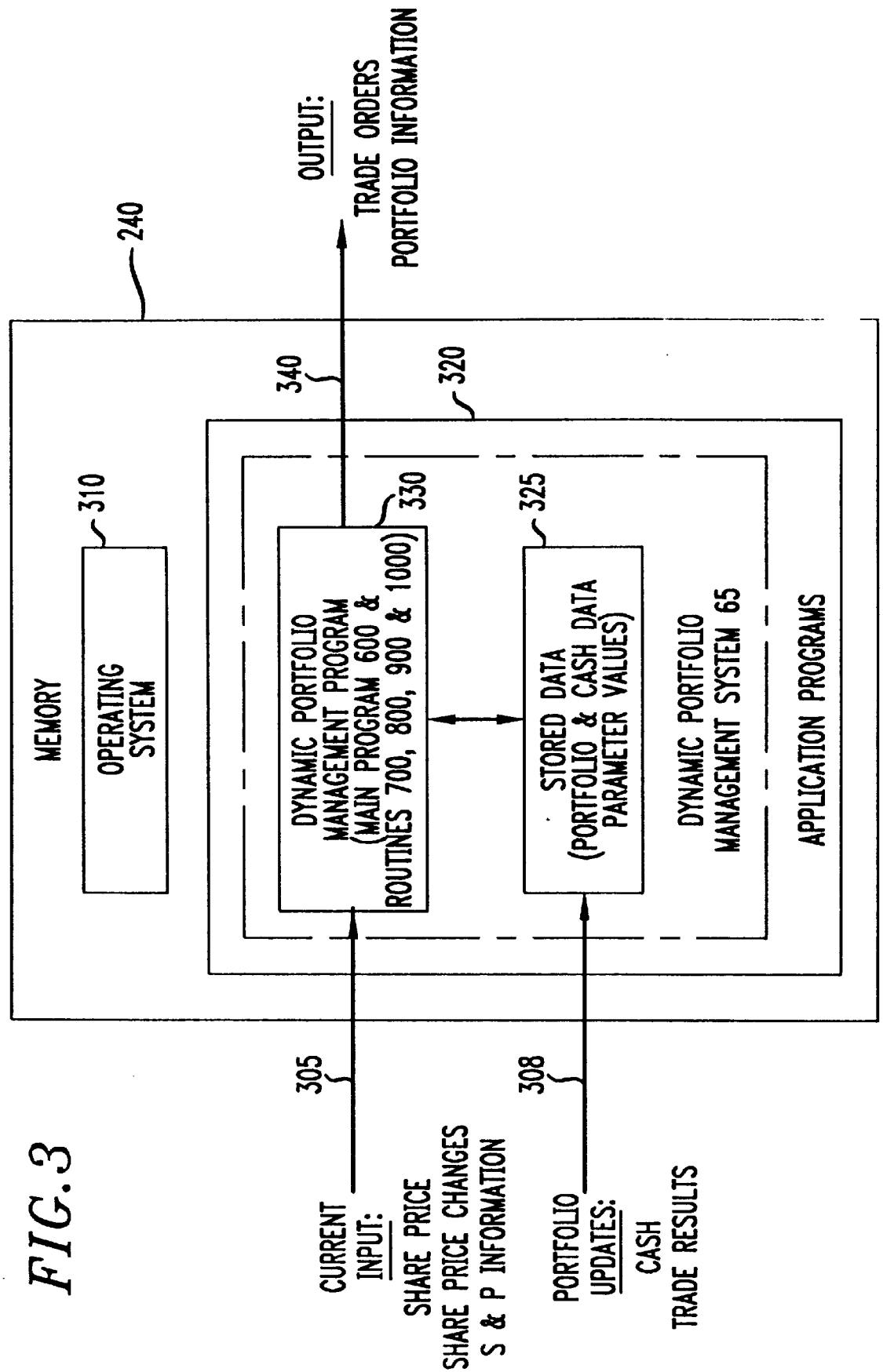
FIG. 3 depicts a high-level block diagram of the software resident within memory 240 and executing within trade generating computer 60, both shown in FIG. 2.

Computer 60, which is preferably a specially programmed workstation or personal computer, comprises input interface (I/F) 210, processor 220, communications interface 230, memory 240 and output interface 250, all conventionally interconnected by bus 260. Memory 240 generally includes different modalities, such as semiconductor read only memory (ROM) and random access memory (RAM) 244 and disk based storage (and appropriate interface) 248, and collectively stores an operating system (O/S) and application programs. The specific software modules and accompanying data that collectively implement the inventive dynamic portfolio management system reside within the application programs, as shown in FIG. 3 and discussed in detail below.

Incoming data, particularly current share price and share price changes provided by the satellite receiver and other sources, including S & P 500 data, are provided via lines 12 and 66, respectively, to computer 60, and particularly to input interface 210 therein. This interface contains appropriate circuitry to provide the necessary and corresponding electrical connection, e.g. direct or modem interfaces required to physically connect and interface each differing source of input data, to computer 60. In addition, input interface 210 electrically connects and interfaces user input device 290, such as a keyboard and mouse, to system 60. Display 270, such as a conventional monitor, and printer 280, such as a conventional laser printer, are connected, via corresponding lines, to output interface 250. Output interface 250 provides requisite circuitry to electrically connect and interface the display and printer to system 60. Accounting computer 80 and trade execution computer 70 are both connected, through LAN 77 and via communications interface 230, specifically a network adapter therein, to computer 60.

In operation, the dynamic portfolio management system is periodically executed, usually during market hours, to: analyze current changes in share price and current S & P composition and weightings, calculate new positions in each security held in the portfolio and issue appropriate market trade orders to appropriately update the portfolio holdings to reflect these new positions. The portfolio management system can be executed on any periodic basis. Based upon the total shares contained in the portfolio for each different security and the attendant transaction costs (i.e. trading ticket charges)—which, on the margin, decrease substantially as larger share blocks are traded, the management system may be run either weekly, for portfolios that contain a relatively small position in each different security, or more often, such as daily, hourly or at even shorter intervals as the size of the portfolio increases. Inasmuch as my inventive management method favorably accounts for market volatility which increases with shorter sampling intervals, increased performance will likely occur with increasingly shorter trading intervals for correspondingly larger portfolios. The interval can be set through an appropriate timer, slaved to a real-time clock, in the operating system.

An analyst stationed at computer 60 can select a particular trade avenue for each trade order as well as set parameters and supply other user information, or through appropriate mouse-based user selection enter queries to obtain current portfolio and/or market information, through appropriate commands entered via device 290 and in response to a program icon or selection menu appearing on display 270.

Inasmuch as the specific hardware components of system 60 as well as all aspects of the software stored within memory 240, apart from those modules that implement the present invention, are conventional and well-known, they will not be discussed in any further detail.

B. Software and Supporting Equations

1. High level overview

FIG. 3 depicts a high-level block diagram of the software (computer executable instructions) resident within memory 240 and executing within trade generating computer 60.

As shown and in pertinent portion, these programs include operating system 310 and application programs 320, the latter containing inventive dynamic portfolio management system 65. System 65 is formed of management program 330, which itself collectively contains main program 600 and routines 700, 800, 900 and 1000 (which are shown in FIGS. 6A–6C, 7A and 7B, 8, 9A and 9B, and 10A and 10B, respectively, all of and described in accompanying text below). Currently, with trade generating computer 60 (see FIG. 2) implemented on a personal computer, operating system 310 is illustratively a DOS based operating system, such as MS-DOS (Microsoft Disk Operating System available from the Microsoft Corporation of Redmond, Washington), with application programs 320 being written in the C Programming language and compiled, under a Microsoft C compiler, for DOS execution. My present invention can be implemented in any one of a wide variety of different programming languages and hence can be readily adapted for execution under any one of many different operating systems, based on the computer system chosen to implement trade generating computer 60.

Incoming share prices, share price changes and S & P 500 information (composition of the index and current shares outstanding), supplied to dynamic portfolio management program 330, are collectively symbolized by line 305. The resulting trade orders generated by program 330 is symbolized by line 340. In addition to programs 330, system 65 also includes accompanying stored data 325. This data, residing on fixed disk storage within memory 240, contains current portfolio holdings, in terms of, e.g., the name of each security held, the number of shares outstanding for that security, a current cash balance, and various predefined parameter values. Input to data 325, in the form of a cash balance and trade results, is collectively symbolized by line 308. Data 325 is illustratively stored in ASCII based files (effectively implementing a data base) with appropriate conventional programs used to download the incoming market data, from the satellite receiver, and the S & P 500 data, from the S & P information server, and update these data files accordingly. Furthermore, accounting computer 80 also updates the portfolio data in a conventional manner with verified trade information, as described above.

2. Process diagram

Figure 4:
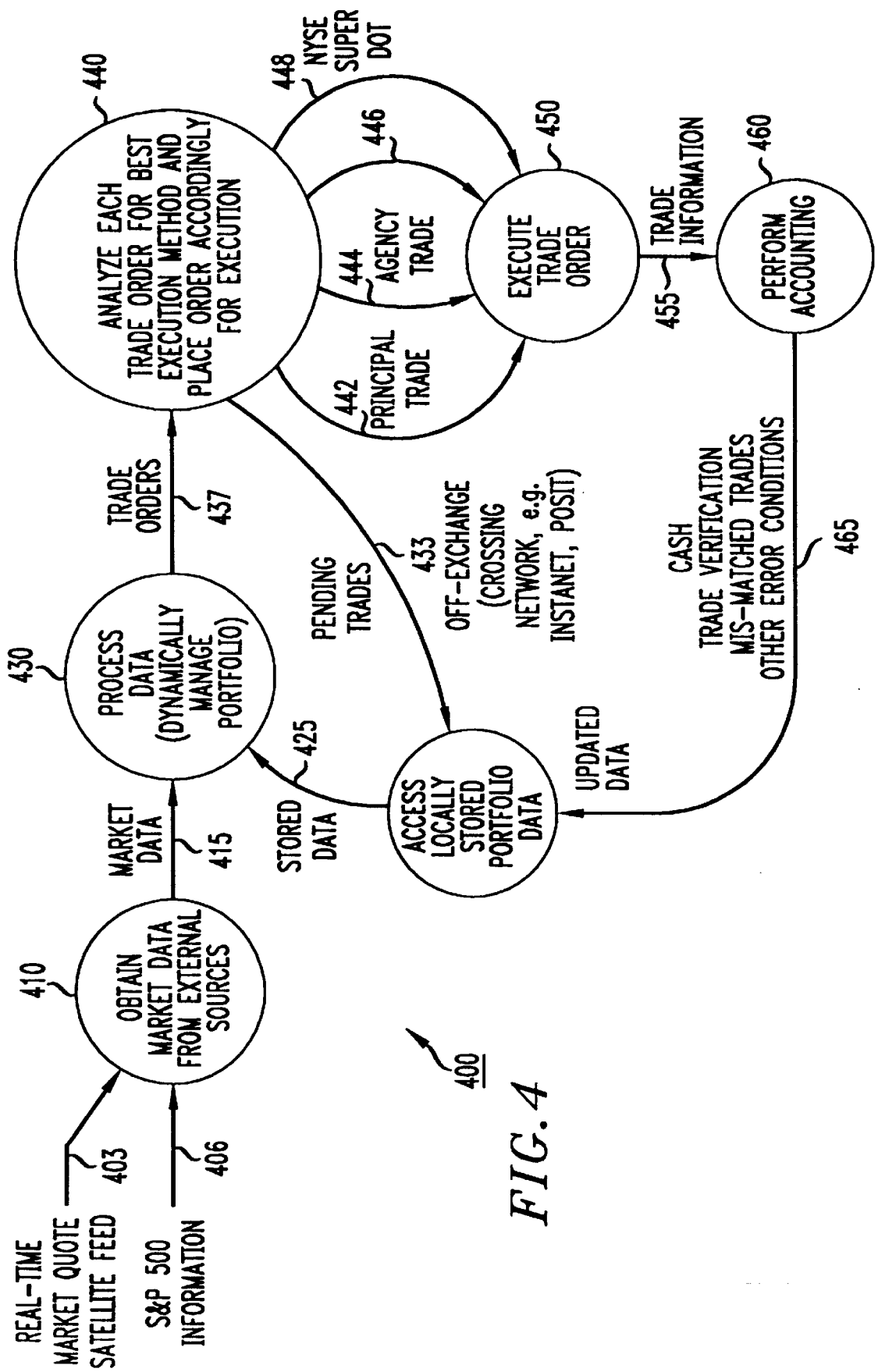
FIG. 4 depicts process diagram 400, which shows various high-level operations that, within the context of system 5 shown in FIGS. 1A–1D, collectively implement my present invention.

FIG. 4 depicts process diagram 400, which shows various high-level operations that, within the context of system 5 shown in FIGS. 1A–1D, collectively implement my present invention.

As shown, the present invention utilizes six distinct high-level operations: 410, 420, 430, 440, 450 and 460. Information incoming from external market sources, such as the real-time market quite satellite feed and the S & P 500 information, as symbolized by lines 403 and 406, are first obtained from these sources through operation 410. The resulting market information is then provided as input and as symbolized by line 415 to operation 430. Operation 420 accesses locally stored portfolio data, including both current security holdings and cash balance, and also applies this stored data, as symbolized by line 425, as another input to operation 430. Based on the market data and stored portfolio data, operation 430 determines the appropriate weighting for each security then in the portfolio to properly rebalance the entire portfolio. As a result of this operation, operation 430 issues appropriate trade orders, as symbolized by line 437, to either buy or sell securities, as much as necessary, in the portfolio to effectuate the rebalancing. Once the trade orders are issued, process 440, currently implemented manually by an analyst working interactively with trade execution computer 70 (see FIGS. 1A–1D), as discussed above, will analyze each trade order to determine the proper avenue for its execution and will place that order accordingly for off-exchange trading (either through the Instanet or POSIT systems), a principal trade, an agency trade (through electronic bulletin board 75 shown in FIGS. 1A–1D and discussed above), or through the NYSE Super DOT system—with these alternatives symbolized by lines 442, 444, 446 and 448, respectively. The stored portfolio data will be updated, as symbolized by line 433, to reflect a list of pending trades resulting from operation 440 such that a particular trade will not be erroneously re-issued. Once the trade has been appropriately placed, that trade is executed (or at least execution is attempted) through process 450. Once the trade has been executed, specific trade information, as to whether the trade order fully or partially executed and what particular positions were traded and the specifics therefor and symbolized by line 455, are applied as input to accounting operation 460, which includes trade verification. The output of operation 460, in the form of a cash position, verified trades, mis-matched trades and other error conditions, is used, as symbolized by line 465, to update the locally stored portfolio data subsequently accessed by operation 420 during the next portfolio rebalancing operation, as so forth.

3. Dynamic portfolio rebalancing equations

In accordance with my inventive teachings, I have recognized that, for a portfolio, Y, such as an index fund, that holds a pre-defined universe of securities which collectively forms a capitalization weighted index, such as the S & P 500 index, by dynamically re-weighting the position of each security in the portfolio in a manner proportional to a non-constant function of current capitalization weights of the securities in the index, then, for appropriately selected functions, the resultant return generated by a portfolio will consistently and reliably outperform that of the index itself.

In particular, given current capitalization weights, $W_1, W_2, \ldots, W_n$ of a capitalization index, such as the S & P 500 index, I have recognized that if a "generating" function $S=S(W_1, W_2, \ldots, W_n)$ is a twice continuously differentiable non-constant function of these weights, then each security in the portfolio, Y, should have a weight, $V_i$, given by equation (1) below.

$$V_i = \left( \frac{D_i S(W_1, W_2, \ldots, W_n)}{S(W_1, W_2, \ldots, W_n)} + 1 - \sum_{j=1}^{n} \frac{W_j D_j S(W_1, W_2, \ldots, W_n)}{S(W_1, W_2, \ldots, W_n)} \right) W_i \quad (1)$$

for $i = 1, \ldots, n$, where: $D_i$ and $D_j$ are partial derivative operators with respect to the $i^{th}$ and $j^{th}$ variables, i.e. here with respect to variables $W_i$ and $W_j$, respectively.

In this case, equation (2) holds as follows:

$$d\ln\left(\frac{Y}{Z}\right) = d\ln S + \Theta dt \quad (2)$$

where d ln (Y/Z) represents the relative performance of the re-weighted (dynamically managed) portfolio Y measured against performance, Z, of the index itself; d ln S represents a logarithmic change in the generating function S; and $\Theta$ measures a rate of differential relative performance between the index itself and the dynamically managed portfolio Y. This differential performance is affected by dividend rates of the two portfolios, the volatility of these two portfolios, and "leakage" of stocks from the index, i.e. stocks which were eliminated from the index itself because their market capitalization sufficiently decreased. I have found that excellent performance occurs where a function that measures diversity of distribution of capital among the stocks in the index is employed for generating function S. Such a diversity based function is typified by entropy or a diversity based measure, $D_p$, as set forth below in equations (3) and (4), respectively.

$$S(W_1, W_2, \ldots, W_n) = -\sum_{i=1}^{n} W_i \ln W_i \quad (3)$$

$$S(W_1, W_2, \ldots, W_n) = \left( \sum_{i=1}^{n} W_i^p \right)^{1/p} \quad (4)$$

For values of diversity exponent p in the range of 0<p<1, both generating functions produce portfolios characterized by reliably positive values of $\Theta$ and stable values of ln S. Furthermore, the generating function $D_p$ shown in equation (4) possesses an advantage of being parameter dependent and adjustable. As discussed in detail below, both equations are appropriately used in my preferred embodiment. Through empirical analysis, I have found that setting the value of exponent p equal to 0.76 produces a portfolio that consistently yields, over a simulated 16 year test interval—as discussed in detail below in conjunction with FIGS. 11–13, an annual return that exceeds that of the S & P 500 index by approximately 40–50 basis points (bp).

For my detailed theoretical analysis in support of these equations, the reader is referred to my following papers: "On the Diversity of Equity Markets", Enhanced Investment Technologies, Inc., (© 1995, 1996, Intech, Princeton, N.J.); "Leakage in Dynamic Index Portfolios", Enhanced Investment Technologies, Inc.(© 1996, Intech, Princeton, N.J); and "Dynamic Index Portfolios and Equity Market Stability", Enhanced Investment Technologies, Inc., (© 1995, 1996, Intech, Princeton, N.J.) which are all incorporated by reference herein and which are the subject of my co-pending United States provisional patent application entitled "Automated Investment Portfolio Construction", Ser. No. 60/021,116 filed Jul. 3, 1996. An earlier version of the first paper, which is also incorporated by reference herein, is the subject of my earlier filed and co-pending United States provisional patent application entitled "Automated Investment Portfolio Construction", Ser. No. 60/008,698 filed Dec. 15, 1995. In addition, for additional supporting theoretical analysis, the reader is also referred to my following paper: "Dynamic Equity Indices", Enhanced Investment Technologies. Inc. (© 1995, 1996, Intech, Princeton, N.J.), which is also incorporated by reference herein.

4. Dynamic Portfolio Management Main Program and routines called thereby

Prior to discussing my inventive software in detail, i.e. the main program and its attendant routines, the reader is directed to FIG. 5 which defines those variables used in conjunction with this software. For easy reference, these variables are grouped into four classes: global parameters 510, variables 520 that pertain to a given portfolio (account), variables 530 that pertain to each individual security in the S & P 500 index, and variables 540 that pertain to each security in a given account. To facilitate understanding, the reader should simultaneously refer to this figure throughout the ensuing discussion of Main Program 600 and routines 700, 800, 900 and 1000 (collectively shown in FIGS. 6A–10B). Each of these variables will be discussed in detail when it first arises during the ensuing discussion.

a. Main Program 600

Figure 6B:
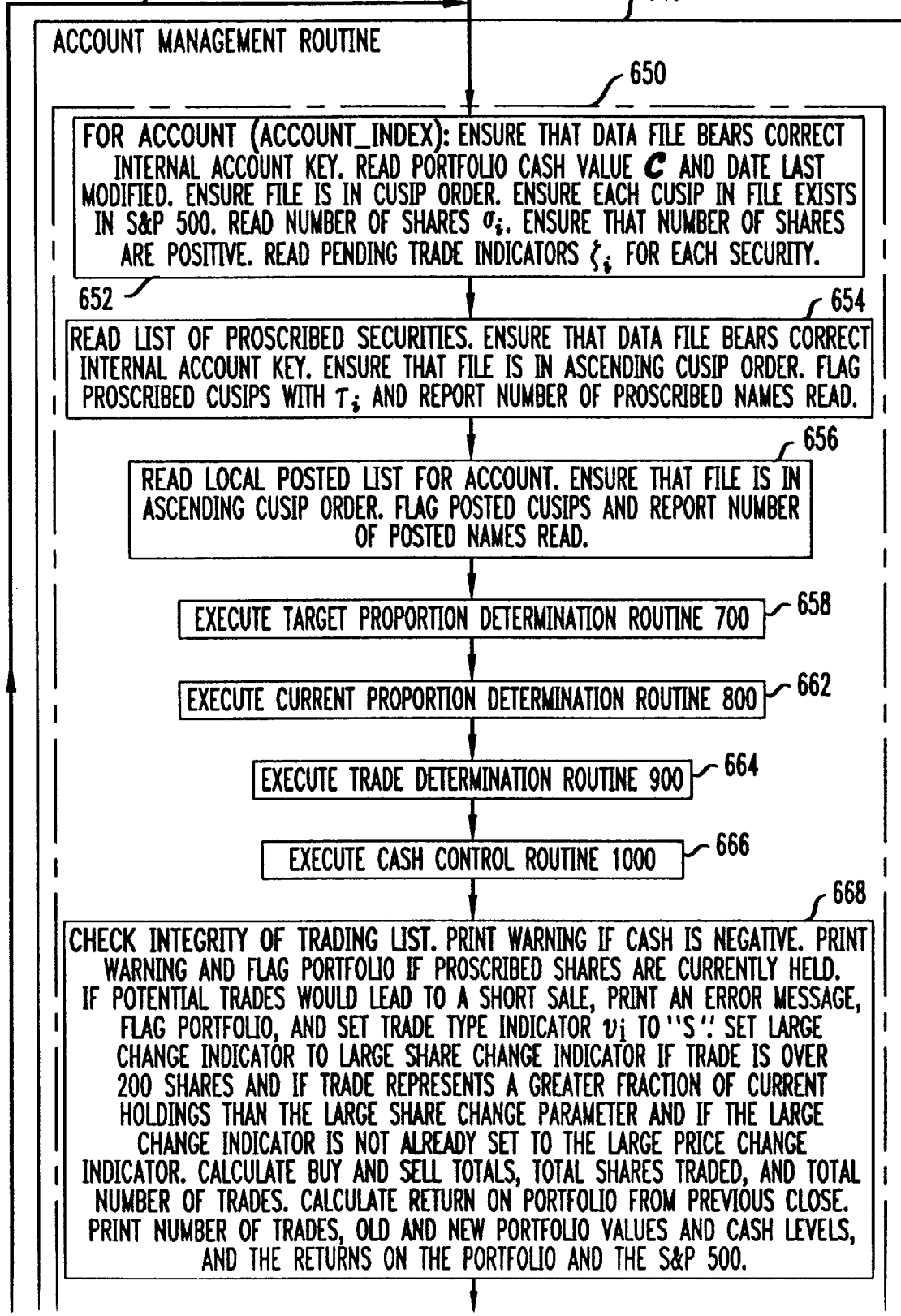
FIGS. 6A–6C collectively depict a high-level flowchart of my Main Program 600 of Dynamic Portfolio Management Program 330, shown in FIG. 3, that is executed within trade generating computer 60, shown in FIG. 2.
Figures 6, 6A, 6B, 6C:
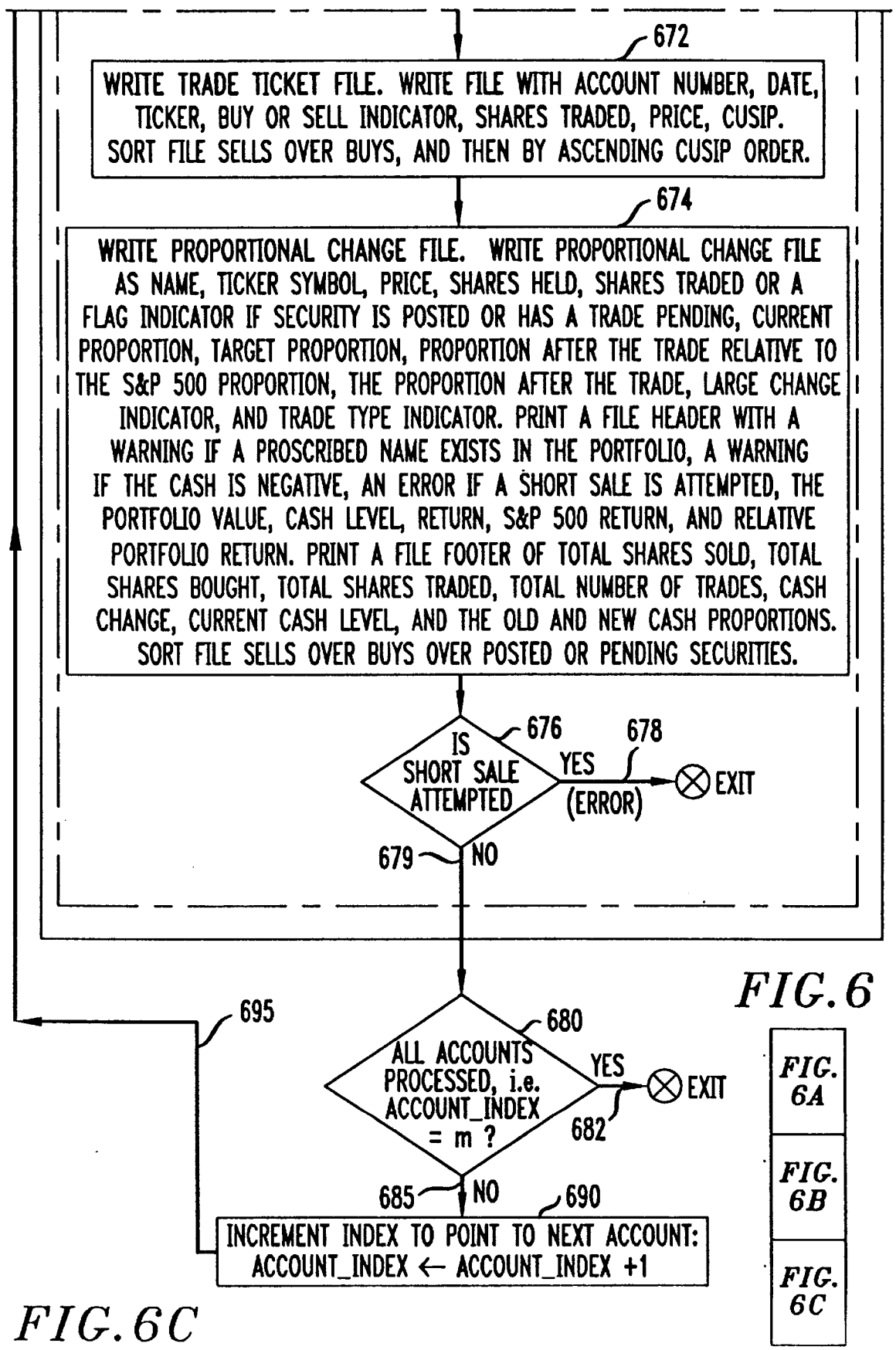
FIG. 6 depicts the correct alignment of the drawing sheets for FIGS. 6A–6C.

FIG. 6 depicts the correct alignment of the drawing sheets for FIGS. 6A–6C;

A high-level flowchart of my Main Program 600 of my inventive Dynamic Portfolio Management System is collectively depicted in FIGS. 6A–6C; the correct alignment of the drawing sheets for these figures is shown in FIG. 6.

Upon entry into Main Program 600, execution first proceeds to block 605. This block, when executed, determines by virtue of the state of two user-settable flags, i.e. a "rebalancing" flag and a "cash investment mode" flag, which of two portfolio management modes are to be currently performed. Through the rebalancing mode, weights of each security in the portfolio are re-calculated and the portfolio holdings dynamically rebalanced with resulting issuance of appropriate market orders. Alternatively, through the cash investment mode, transactions are generated to consume excess cash (e.g. large cash inflows) in the portfolio that may have arisen as a result of recent dividend payment(s) and/or security sales without sufficient offsetting purchases. Variable $\mathcal{M}$ is set to one if rebalancing is to occur; to zero otherwise, i.e. cash investment is to be executed.

Thereafter, execution proceeds to block 610, which through block 615 executed therein, performs various initialization operations, specifically reading various pre-defined and stored limit values and setting various threshold values. The numeric and illustrative values which I currently use are set forth in parentheses. In that regard, an assumed trading cost variable is set to illustratively $0.15/share to reflect ticket (brokerage) charges. This charge can be set to a lower number, or an appropriate function of share volume to be traded, in order to accurately reflect marginal cost decreases for transactions involving increasing numbers of shares. A large price change threshold is set to illustratively 10%, i.e. a large price change flag for a given security is set whenever a share price change of more than 10% is detected from the last time rebalancing occurred. A large share change threshold is set to illustratively 20%, i.e. a large share change flag will be set whenever a trade order issues to sell more than 20% of the shares currently held in any one security in the account. A minimum trade size, $\mathcal{W}$, as a percent of current holdings, is set at illustratively 0.01%, i.e. trades in a security will not be executed for less than 0.01% of the portfolio value. A minimum buying price variable, $\mathcal{P}$, at which a security will be bought is set to illustratively $0.01. A variable, $C$, will be set to illustratively 0.02% to reflect the maximum amount of cash, as a percentage of total current portfolio value, that is to be maintained, i.e. not invested during dynamic rebalancing. A variable, $\tilde{C}$, is also set to reflect the maximum amount of cash, illustratively 0.2%, as a percentage of the total current portfolio value that is to be maintained before the cash investment mode is automatically invoked. A variable, $\mathcal{B}$, is illustratively set to 5%, as a stock trading band. In that regard, if the actual weighting, as a percentage of the total portfolio, at which a security is currently held lies within a range of the "target" weighting determined through rebalancing, this range being the stock trading band (here illustratively ±5% of the weight), then no trade is triggered to change the holding in this security. Lastly, the exponent for dynamic rebalancing, referred to above as p and hereinafter also referred to as $\mathcal{F}$, is illustratively set to the value 0.76.

Once block 615 has fully executed, execution proceeds from block 610 to block 620. This latter block first obtains market share price and share price change data from the real-time market data feed, e.g. the satellite feed, and S & P composition information from the S & P 500 Information server. Specifically, this block obtains security information for each security in the S & P 500 in terms of: a ticker symbol (as used in the NYSE to identify the security by name), a CUSIP number (a unique alphanumeric identifier for each different security), a security name, current price (here denoted as $p_i$ and not to be confused with exponent p above), total number of shares outstanding, $S_i$, and a change in price from the previous market close. Once this data is obtained, block 620 organizes this data in ascending order by CUSIP number, and ensures, for error checking, that all price data is positive—with appropriate changes being made, through involving proper human intervention, to appropriately correct negative price data (which is clearly erroneous). In the event that the price for any security has changed in excess of the large price change threshold, typically 10% as noted above, then the large price change flag is set for that security. Based on the data reflecting the current securities in the S & P 500, the total number of shares outstanding of each of these securities and its current price, block 620 then calculates the S & P 500 weighting for each security currently contained within the S & P 500 index. Once these operations are complete, execution exits for the entire trading day from block 620. This same information is used with respect to each different portfolio that is to be dynamically rebalanced with respect to the S & P 500 index. Alternatively, if another capitalization weighted index (indices), other than the S & P 500 index, is to be used, then block 620 would be suitably modified to obtain similar data but pertinent to the securities held in that index(indices). Thereafter, execution proceeds to block 625 which reads a "global posted stock list". This list contains securities, in CUSIP order, that can not be traded, for one reason or another, in any portfolio (account) currently being dynamically managed. Thereafter, execution proceeds to block 630 which obtains a list of accounts (different portfolios) that are to be dynamically rebalanced. The value of variable n is set to the total number of such accounts to be managed.

Thereafter, each separate account is then managed, through either of the two modes, i.e. its holdings are either dynamically rebalanced or its cash position is modified through cash investment. In that regard, execution now proceeds to block 635 which sets the value of an index variable, ACCOUNT_INDEX, to one, i.e. to point to the first account to be managed. From this point, the program iteratively executes account management block 640 for each separate account to be managed, after which execution exits from main loop 600.

In particular, when execution enters account management routine 640, block 650 is executed for the next successive account to be managed, i.e. ACCOUNT (ACCOUNT_INDEX). Upon entry into block 650, execution first proceeds to block 652 which, when executed, reads data for the current holdings in this particular account. To prevent errors, this data includes a "key" which is common to each file for a given account. In the event a "key" read for a file for the current account does not match the predefined key established for that account, an appropriate error message is generated to invoke human intervention. Other parameters for this account, such as its current cash balance, K, and the date the account was last dynamically rebalanced are read by block 652 (see FIGS. 6A–6C) as well. This block also ensures that the data files for this account are organized in ascending CUSIP order and changes the files, as needed, to reflect this ordering. For consistency, block 652 also checks that each security stored in the data for the portfolio currently exists in the S & P 500; otherwise, that security (i.e., the entire holdings therein) is flagged for sale. For each security currently held in the portfolio, block 652 retrieves the number of shares currently held, $\sigma_i$, and ensures, by appropriate correction, that this number is positive. Should this number be negative—which signifies an error condition, then the program halts pending proper human intervention to correct the error. In addition, block 652 reads pending share indicators, $\zeta_i$, (should they exist) for each security. These indicators signify that a trade has already been previously sent for execution for that security to the market but has not yet occurred. If the portfolio is rebalanced at rather long intervals, such as weekly or monthly, then all trade orders will have been settled well before, and with most likely no pending trades in existence, the next time dynamic rebalancing is to occur. Once block 652 has fully executed, execution proceeds to block 654. This latter block reads a local list of securities which for one reason or another, can not be traded in the present account, such as portfolios that are directed to "socially responsible" companies, i.e. without, e.g., tobacco related stocks, and other such restricted portfolios. Block 654 ensures that the security data read for this list is organized in ascending CUSIP order as well, with the proscribed CUSIP value, $\tau_i$, of each security noted along with a total number of such securities in the list and makes appropriate corrections to this organization, if necessary. Thereafter, block 656 is executed to read a local "posted" list for the account which delineates those securities, by CUSIP number, that have been previously designated as being "proscribed". Block 656 then updates this posted list with any additions or deletions based on the list read by block 654 in order to reflect changes in the securities that have been proscribed from being traded in the account.

Thereafter, execution proceeds to block 658 which executes Target Proportion routine 700. This routine, shown in FIGS. 7A and 7B and discussed in detail below, determines the dynamically rebalanced weight (i.e. "target proportion") for each security currently held in the account. Once this occurs, block 662, shown in FIGS. 6A–6C, executes to invoke Current Proportion Determination routine 800, shown in FIG. 8 and discussed in detail below, which determines the weighting, as a proportion of the total asset value of the account, at which each security therein is currently held. Once this occurs, execution proceeds to block 664, shown in FIGS. 6A–6C, which invokes Trade Determination routine 900, shown in FIGS. 9A and 9B and discussed in detail below. This routine determines whether a trade is necessary in each security held in the account and generates a trading list. In particular, if this routine concludes that a trade is necessary for a given security in the account, then the routine determines the appropriate order to either buy or sell the security and in what share quantity, and hence rebalance the holding of that security in the account, and enters that order to a trading list. Execution then proceeds to block 666, shown in FIGS. 6A–6C, which invokes Cash Control routine 1000 (see FIGS. 10A and 10B and discussed in detail below) to invest any excess cash, if any, then held in the account.

Once block 666 has fully executed, execution proceeds to block 668. This latter block, when executed, checks integrity of the trading list generating by routine 900. This checking first involves assessing whether a resulting cash balance in the account is negative. Since negative cash balances, at this point in the program, are not allowed, any such negative condition is an error condition requiring human intervention to resolve, such as by invoking the cash investment mode to sell appropriate positions in order to raise sufficient minimum cash. In addition, a flag is set and a warning message generated if the trading list contains an order involving a proscribed security. Furthermore, a warning message is provided, and a trade type indicator, $v_i$, for the security is set to "S" (for "Short"), if a potential sale leads to a negative share position, i.e. a so-called "short sale". Such negative positions are also not permitted and signify a need for human intervention to correct. Alternatively, if an order involves more than 200 shares of a given security and if the trade represents a greater fraction than the large share change threshold (currently set to 20%) of the holdings in that particular security, then the large change indicator is set appropriately to signify this (if it has not already been so set). Thereafter, block 668 calculates the total number of the buy and sell orders, the total number of the shares to be traded and the total number of trades in the trading list to be executed. Once this is accomplished, block 668 calculates the return provided by the account since the previous market close. Lastly, block 668 provides as output, illustratively in printed form, the number of trades to execute, the immediately prior and now rebalanced account (portfolio) holdings and value, cash balance in the account and the returns on both the account and the S & P 500 index. Execution then exits from block 668.

At this point, two output files containing trade orders and other information are generated.

To generate the first file, execution proceeds to block 672 which generates an output trade ticket file (i.e. a "trade" file) from the trading list. This file, which will ultimately be supplied to a broker for execution, through a selected trading avenue, contains the number of the account (individual portfolio) in which all these trades are to occur; the current date; and for each trade: the ticker symbol of each security to be traded, whether that trade is a buy or sell, the number of shares to be traded, the current price of the security and the CUSIP identifying that security. This file is sorted with sell orders preceding buy orders and the trades for each then ordered in ascending CUSIP order.

Once this trade file has been fully generated, execution proceeds to block 674 which generates a "proportional change" file for the account, i.e. for ACCOUNT (ACCOUNT_INDEX ). This file contains various information, to wit for each security in the account: (a) the name of that security; (b) the ticker symbol therefor; (c) the number of shares currently held or a flag indicating either that this security is posted (i.e. proscribed from being traded)

or has a trade pending; (d) the current and target proportions for this security, (e) the proportion target proportion after the trade and relative to the S & P 500 proportion (weighting), (f) the actual proportion that will exist after the trade; (g) the large change indicator; and (h) a trade type indicator. This trade type indicator will be set to: "C" for a cash control trade, "S" for an attempted short sale, "P" for a proscribed security, or "0" for liquidation of a security for which the target proportion has been set to zero. Thereafter, block 674 will print a file header with an appropriate warning if: a proscribed security were to exist in the account, the cash balance in the account were to be negative, or a short sale were to be attempted. This block will also print: the current portfolio value, the current cash level, the present return, the S & P 500 return, and a return of the account relative to that of the S & P 500. Block 674 will also print a file footer containing: the total number of shares to be sold, the total number of shares to be bought, the total number of shares to be traded, the total number of trades to be executed, an amount by which the current cash balance in the account is to change, the current cash balance in the account, and old and new cash proportions in the account (proportions of account value attributable to cash). The proportional change file is sorted in order of sell orders, buy orders and posted or pending securities. Once this file is completely generated, execution passes to decision block 676 to test for any attempted short sales. If such a sale is detected, then, since short sales are not permitted, an error condition has occurred. Hence, execution exits from program 600, via YES path 678 emanating from decision block 676. Appropriate human intervention is then solicited to investigate and resolve the error. Alternatively, if decision block 676 does not detect any attempt at a short sale, then it routes execution, via NO path 679, to block 680. At this point, the security holdings in the account have been completely processed and, as such, the underlying portfolio dynamically rebalanced.

Accordingly, decision block 680 then executes to determine if all accounts (different portfolios) have been managed. If another account remains to be managed, i.e. the current value of variable ACCOUNT_INDEX is less than the value n, then decision block 680 routes execution, via NO path 685, to block 690. This latter block, when executed, increments the value of variable ACCOUNT_INDEX to point to the next successive account to be managed. Execution then loops back, via path 695, to iteratively execute account management routine 640 for this next successive account, and so forth. Alternatively, if all the accounts (different portfolios) have been separately managed, each through a separate execution of routine 640, i.e. the current value of variable ACCOUNT_INDEX equals the value n, then execution simply exits, via YES path 682, from Main Program 600.

b. Target Proportion Determination routine 700

Figure 7A:
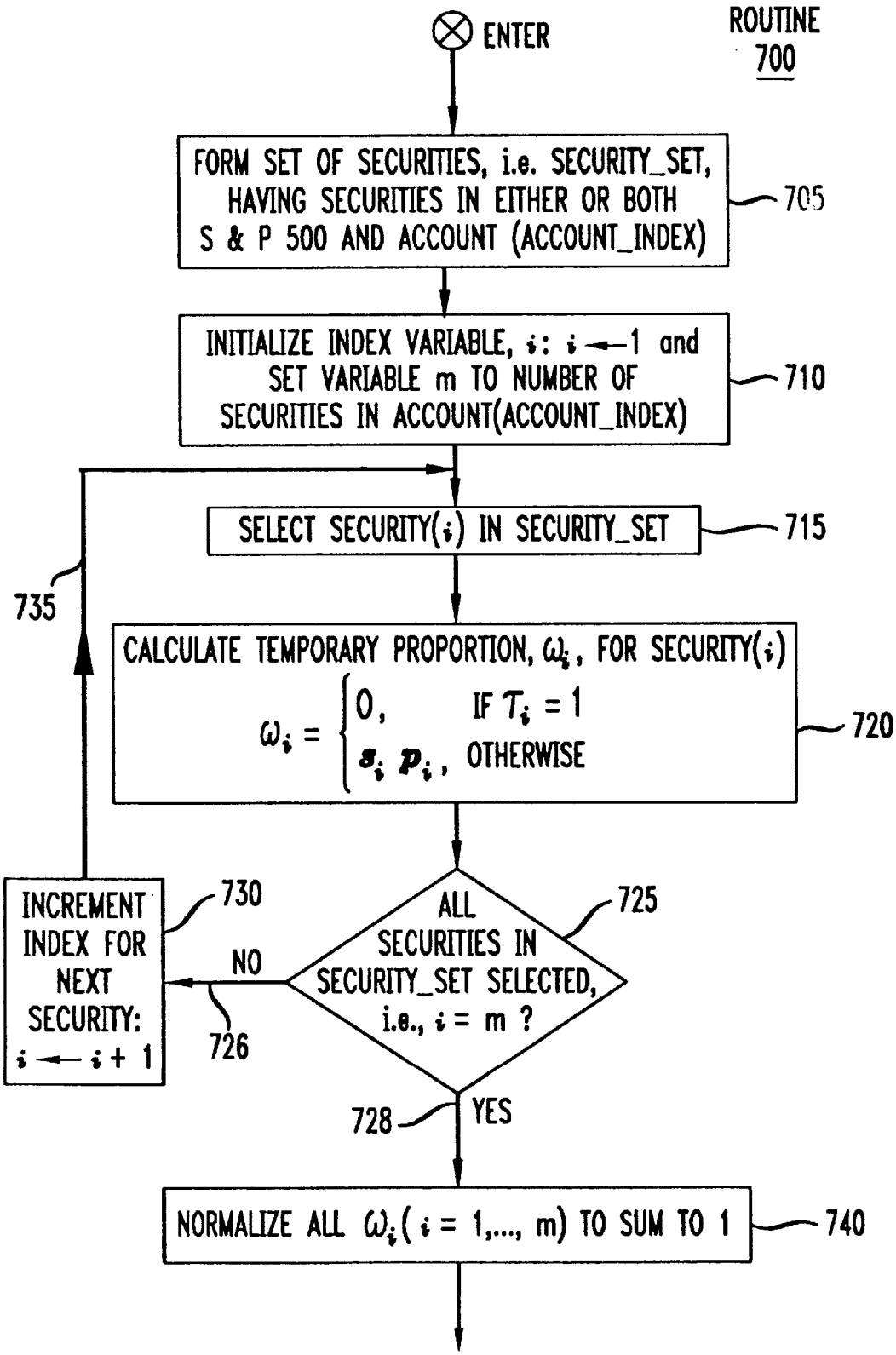

A flowchart of Target Proportion Determination routine 700 that is executed by Main Program 600 is depicted in FIGS. 7A and 7B; the correct alignment of the drawing sheets for these figures is shown in FIG. 7. As noted above, routine 700 determines the dynamically rebalanced weight (i.e. "target proportion") for each security currently held in an account to be processed, i.e. ACCOUNT(ACCOUNT_INDEX) and for which trading is permitted.

Upon entry into this routine, execution proceeds to block 705. This block, when executed, forms a set of securities, i.e. SECURITY_SET, which has securities that are in either or both the S & P 500 index and the account. These include the securities that are to be dynamically managed in the account. Weights are calculated and assigned for all the securities for which trading is permitted. Once this set is established, block 710 is executed. This block initializes an index variable, i, to the value "one" and sets a variable, m, equal to the number of securities in the account to be processed, i.e. in ACCOUNT(ACCOUNT_INDEX).

Thereafter, execution enters a loop composed of blocks 715, 720, 725 and 730 to calculate, a temporary proportion for each security, i.e. for SECURITY(i), in the set. In particular, block 715, when executed, selects a next successive security in the set as indicated by the current value of index variable i. Execution then proceeds to block 720 which, for each security for which trading is permitted (i.e., $\tau_i$ does not equal 1) calculates a temporary proportion, $\omega_i$, to be a market capitalization of that security which is a product of a current price of that security ($p_i$) and a number of shares ($s_i$) thereof currently outstanding. Once this occurs, decision block 725 executes to determine whether all securities in the set have been selected, i.e. whether the current value of index variable i equals the value of variable m. If a security in this set remains to be selected, then decision block 725 routes execution, via NO path 726, to block 730. This latter block increments the current value of index variable i by one in order to point to a next successive security in the set. Execution then loops back, via path 735, to block 715 to appropriately process that security, and so forth. Alternatively, if all the securities in the set have been so processed with a temporary proportion calculated for each, then decision block 725 routes execution, via YES path 728, to block 740. Block 740 normalizes all the values of the target proportions ($\omega_i$, i=1, 2, . . . , m) such that their total sum equals the value one. Execution then proceeds to block 745 which re-initializes the value of index variable i to one.

At this point, execution enters a loop formed of blocks 750, 755, 760 and 770 to calculate the target proportion for each security, i.e. for SECURITY(i), in the set for which trading is permitted. In particular, block 750, when executed, selects a next successive security in the set as indicated by the current value of index variable i. Execution then proceeds to block 755 which, for each security, calculates a target proportion, $\pi_i$, for SECURITY(i), using either an entropy or diversity measure as embodied, respectively, in equation (3) or (4) above, as a function of its current market capitalization weighting. An entropy measure is used for non-zero capitalization weightings (i.e. securities in which trading is permitted) and where the diversity exponent has been predefined as zero. Where the diversity exponent (here $\mathcal{F}$) is set to 0.76, as in the preferred embodiment, then, for those securities in the set for which trading is permitted, a diversity measure, as embodied in equation (4), is used instead to calculate the target proportion for each such security. Once this occurs, decision block 760 executes to determine whether all securities in the set have been selected, i.e. whether the current value of index variable i equals the value of variable m. If a security in this set remains to be selected, then decision block 760 routes execution, via NO path 762, to block 770. This latter block increments the current value of index variable i by one in order to point to a next successive security in the set. Execution then loops back, via path 775, to block 750 to appropriately process that security, and so forth. Alternatively, if all the securities in the set have been so processed with a target proportion calculated for each, then decision block 760 routes execution, via YES path 764, to block 780. Block 780 normalizes all the values of the target proportions ($\pi_i$, i=1, 2, ..., m) such that their total sum equals the value 1. Once this normalization has occurred, execution exits from routine 700.

c. Current Proportion Determination routine 800

FIG. 8 depicts a flowchart of Current Proportion Determination routine 800. This routine, as noted above, determines the weighting, as a proportion of the total asset value of the account, at which each security therein is currently held.

Upon entry into this routine, execution proceeds to block 810. This block, when executed, calculates the total current value of the account, i.e. ACCOUNT(ACCOUNT_INDEX). This value, $V$, is simply the sum of the current cash balance, $K$, in the account and the accumulated product, summed over all the securities in the account, of the current price of each such security ($\bar{p}_i$) and the number of shares held therein ($\sigma_i$). Once this value is established, block 820 is executed, as an error checking measure, to ensure that this value is positive. If a negative value results, which clearly signifies an error condition, the program halts pending appropriate human intervention to appropriately correct the error. Thereafter, block 830 executes to initialize index variable, i, to the value "one".

Execution next enters a loop composed of blocks 840, 850, 860 and 870 to calculate, a current proportion for each security, i.e. for SECURITY(i), in the set. In particular, block 840, when executed, selects a next successive security in the set as indicated by the current value of index variable i. Execution then proceeds to block 850 which, for each security in the set, calculates a current proportion, $\rho_i$, to be a market capitalization of that security which is a product of the current price of that security ($\bar{p}_i$) and the number of shares held therein ($\sigma_i$) divided by the current value of the account, $V$. Once this occurs, decision block 860 executes to determine whether all securities in the set have been selected, i.e. whether the current value of index variable i equals the value of variable m. If a security in this set remains to be selected, then decision block 860 routes execution, via NO path 863, to block 870. This latter block increments the current value of index variable i by one in order to point to a next successive security in the set. Execution then loops back, via path 875, to block 840 to appropriately process that security, and so forth. Alternatively, if all the securities in the set have been so processed with a current proportion calculated for each, then execution exits from routine 800, via YES path 867 emanating from decision block 860.

d. Trade Determination routine 900

Figure 9A:
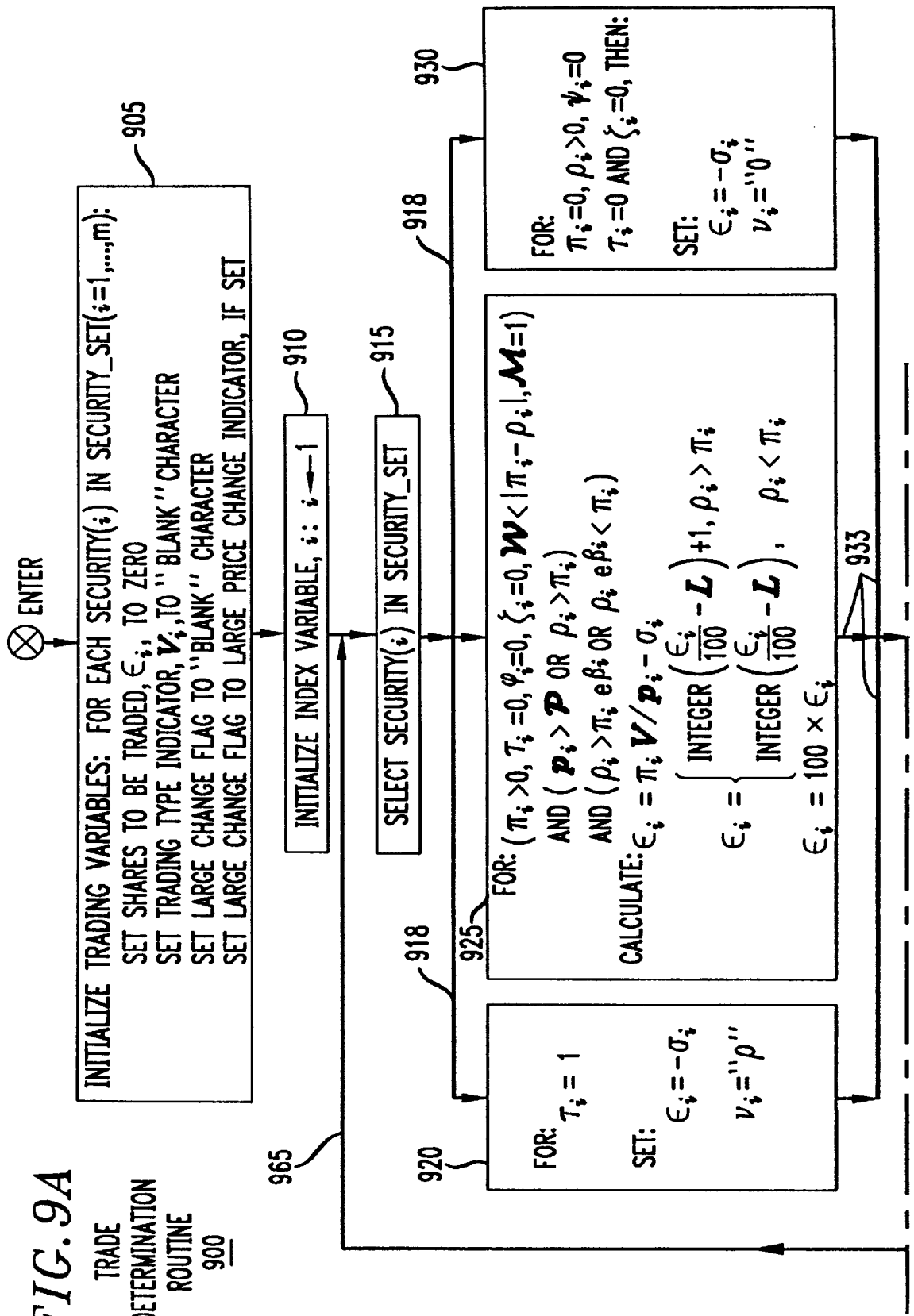

A flowchart of Trade Determination routine 900 is collectively depicted in FIGS. 9A and 9B; the correct alignment of the drawing sheets for these figures is shown in FIG. 9. As noted above, routine 900 determines whether a trade is necessary in each security held in the account and, if so, generates the appropriate trade. In particular, if this routine concludes that a trade is necessary for a given security in the account, then the routine determines the appropriate amount of shares in each security to either buy or sell, and hence rebalance the holding of that security in the account.

Upon entry into routine 900, execution first proceeds to block 905. This blocks initializes various variables. In particular, for each security, SECURITY(i) for i=1, 2, ..., m, in the set: a variable, $\epsilon_i$ which specifies the number of shares to be traded is set to zero; the trading type indicator, $v_i$, is set to a "blank" character; a large change flag is set to a blank character or alternatively to signify a large price change, if so previously set. Once these operations have occurred for each security in the account, then execution proceeds to block 910 which resets the value of index variable i to one.

Once this occurs, the program enters a loop containing blocks 915, 920, 925, 930, 940, 945, 950 and 960 to calculate the appropriate, trade if any, for each security then held in the account. Specifically, block 915, when executed, selects SECURITY(i) in the set of securities, SECURITY_SET, previously defined, as described above, through execution of block 705 in routine 700 (see FIGS. 7A and 7B). Once this security has been selected, then as shown in FIGS. 9A and 9B, either one of three scenarios will govern how, if at all, trading involving that security is to occur. Execution will proceed, via path 918, to each of these scenarios, only one of which will be performed if its accompanying test condition is met. These scenarios are depicted as blocks 920, 925 and 930.

Block 920 handles each of those securities which are proscribed from being traded in the portfolio, i.e. where $\tau_i$ equals one. In this case, for a proscribed security, since the security might have become proscribed after a position has been established therein, block 920 merely sets the amount of shares to be traded, specifically sold, in that security, i.e. $\epsilon_i$, equal to the entire position therein. A negative value of $\epsilon_i$ signifies a sale of securities while a positive value indicates a purchase, the amount of the sale or purchase being given by the magnitude of $\epsilon_i$. Inasmuch as this security is now proscribed, block 920 also sets the trade type indicator for this security to "P" to signify this condition. Thereafter, execution is routed, via paths 933 to block 940.

Block 925 handles each of those securities in which a portion of the current holdings therein is to be sold, or shares are to be purchased. Such a trade will be generated only if a security and its associated parameters meet three conditions. Block 925 first tests the current security, SECURITY (i), for conformance with these conditions. If any of these conditions fails, then the remainder of this block does not execute. In that case, either the trade will be governed by blocks 920 or 930, or, if not, execution will be directed onward to block 940. These conditions are, for SECURITY (i):

(a) first, that:
(1) its target proportion, $\pi_i$, is positive
(2) it is not proscribed and not posted (both $\tau_i$ and ($\psi_i$ are zero, respectively);
(3) it does not have a trade pending (i.e. $\zeta_i$ is zero—the importance of this being that to prevent issuance of potentially a duplicate trade);
(4) a difference between the target and current proportions is greater than a minimum trade proportion ( $\psi < |\pi_i - \rho_i|$); and
(5) that the account is to be dynamically rebalanced (i.e. $\mathcal{M}=1$) and (b) second, that for this security:
(1) its current price ($\bar{p}_i$) exceeds a minimum price ($P$) at which any under-weighted security is to be bought; or
(2) its current proportion ($\rho_i$) exceeds its target proportion ($\pi_i$); and (c) third, that its target and current proportions satisfy either of the following inequalities:
(1)

$$\rho_i > \pi_i e^{\beta_i} \qquad (5)$$

or (2)

$$\rho_i e^{\beta i} < \pi_i \qquad (6)$$

If, for any security, SECURITY(i), all three conditions are satisfied, then block 925 determines the amount of shares to be traded, i.e. a current trade, in that security, $\epsilon_i$. Block 925 first calculates this amount as being equal to the target proportion multiplied by the total portfolio value divided by the current price of this security ($\pi_i V/p_i$) less the current number of shares held in that security ($\sigma_i$). Inasmuch as a security trade will only be issued in round lots, i.e. in lots of 100 share multiples, block 925 then rounds the calculated number of shares to be traded to the nearest multiple of 100 shares, using a centering variable, L. This variable specifies the band, relative to the middle of any 100 share lot, at which a share quantity will be rounded to the next higher lot. This variable, which is predefined for any given account and generally constant therefor will be increased in situations where a low cash balance exists in the account in order to permit the cash control mode to properly converge. In those instances where the current proportion exceeds the target proportion, then the trade is a sell with the number of round lots given by:

$$\epsilon_i = Int\left(\frac{\epsilon_i}{100} - L\right) + 1. \qquad (7)$$

Alternatively, where the current proportion is less than the target proportion, then the trade is a buy with the number of shares, in numbers of round lots, given by:

$$\epsilon_i = Int\left(\frac{\epsilon_i}{100} - L\right). \qquad (8)$$

Once the number of shares, in terms of round lots, has been calculated, the actual number of shares to be traded is determined simply by multiplying the number of lots to be traded by 100, i.e. $\epsilon_i = \epsilon_i \times 100$. With this share quantity determined, execution then exits from block 925 and is routed to block 940. If the cash investment, rather than dynamic rebalancing, mode is to occur (i.e., M could equal 0), then no trades will be executed through block 925 for any security, with such trades governed by executing cash control routine 1000, as discussed in detail below, upon termination of currently executing routine 900.

Block 930 handles each of those securities which have a zero target proportion and a positive current proportion (i.e. $\pi_i$ equals zero, but $\rho_i$ is both greater than zero, respectively), is not posted ($\psi_i$ is zero) and not proscribed ($\tau_i$ is zero) and for which are trade is not pending. In this case, the entire position in that security is to be sold. This scenario includes those securities that have been eliminated from the index. Therefore, to eliminate the entire position in the security, block 930 sets the amount of that shares to be traded, specifically sold, in that security, i.e. $\epsilon_i$, equal to the entire position therein. Inasmuch as the security is not proscribed, block 930 also sets the trade type indicator, $v_i$, for this security to "0" to signify this condition. Thereafter, execution is routed, via paths 933 to block 940.

Block 940 for each of those securities where a non-zero amount of shares is to be traded but the trade would result in a short sale, i.e. where $\epsilon_i < -\sigma_i$, sets the amount of shares to be sold to equal the entire position therein, i.e. $\epsilon_i = -\sigma_i$.

Thereafter, execution proceeds to block 945 which updates, based upon the current trade just determined, the current cash balance in the account and the current portfolio value. Specifically, block 945 updates the cash balance by first calculating the total cost, $\gamma$, associated with the current trade. This cost is illustratively calculated as being the assumed trading cost ($0.15/share) multiplied by the number of shares to be traded. Other cost metrics, such as a flat or sliding fee, can be used instead, if and when appropriate. Once the trade cost is determined, the current cash balance, K, itself is updated as simply the prior cash balance less number of shares to be traded multiplied by their price per share less the trade cost. Lastly, the portfolio value, $V$, is updated by simply subtracting the trade cost, $\gamma$. Each trade so generated is then inserted by block 945 as an entry in a trading list.

Once this occurs, decision block 950 executes to determine whether all securities in the set have been selected, i.e. whether the current value of index variable i equals the value of variable m. If a security in this set remains to be selected, then decision block 950 routes execution, via NO path 953, to block 960. This latter block increments the current value of index variable i by one in order to point to a next successive security in the set. Execution then loops back, via path 965, to block 915 to appropriately process that security, and so forth. Alternatively, if all the securities in the set have been so processed, then execution exits from routine 900 via YES path 957 emanating from decision block 950.

e. Cash Control routine 1000

Figure 10A:
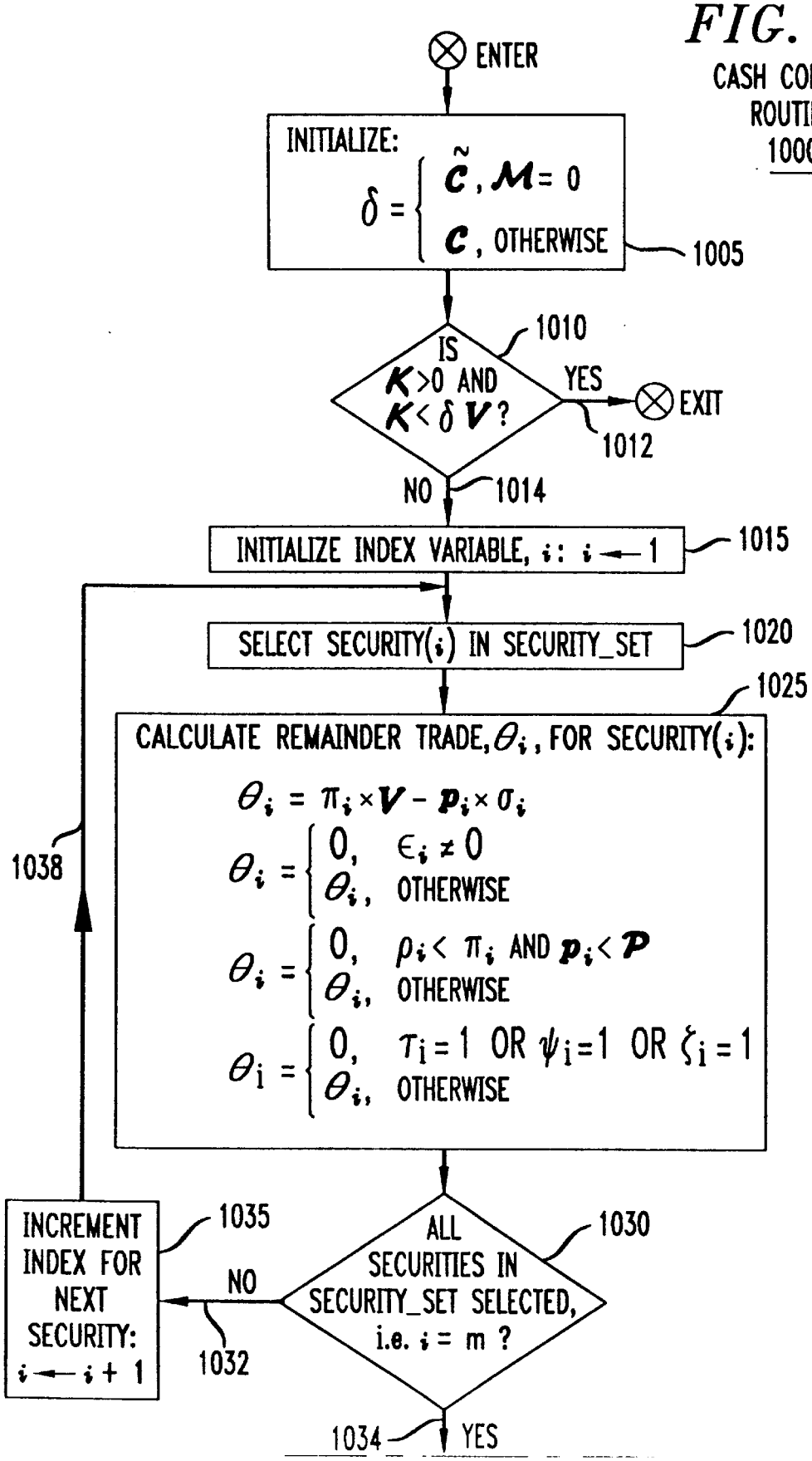

A flowchart of Cash Control routine 1000 is collectively depicted in FIGS. 10A and 10B; the correct alignment of the drawing sheets for these figures is shown in FIG. 10. As noted above, this routine generates appropriate trades to invest any excess cash, if any, then held in the account. This routine is executed during both the dynamic rebalancing and cash investment modes.

Upon entry into routine 1000, execution proceeds to block 1005 which sets a "trigger cash proportion" variable, δ, appropriately. This variable signifies when, given the present cash balance in the account being processed, cash control is to be performed for the account. Specifically, if cash control is to solely executed, i.e. during the cash investment mode and in the absence of dynamic rebalancing such as would occur as a result of a cash infusion resulting from dividend payments, then the variable $\mathcal{M}$ would have been set, as described above, through execution of initialization block 605 in Main Program 600 (see FIGS. 6a–6C), to zero. In this case, the trigger cash proportion is set to the cash investment trigger proportion, $\tilde{C}$, which as discussed above is currently set to illustratively 0.2% of the current total portfolio value. Alternatively, if cash control is not to be solely performed, i.e. the program executing in the dynamic rebalancing mode, then the trigger cash proportion is set to the cash maintenance proportion, which as discussed above is illustratively 0.02% of the current portfolio value. Once block 1005 has executed, execution proceeds to decision block 1010 to test the current cash balance in the account with respect to the trigger cash proportion multiplied by the total portfolio value. If this balance is positive but less than the trigger cash proportion multiplied by the account value, then this balance is within allowable cash limits. Hence, execution exits from routine 1000 via YES path 1012 emanating from decision block 1010. Alternatively, if the cash balance exceeds the trigger cash proportion multiplied by the account value, then the account contains excess cash. Hence, decision block 1012 routes execution, via NO path 1014, to block 1015. This latter block initializes the value of index variable i to one.

At this point, execution enters a loop containing blocks 1020, 1025, 1030 and 1035 to calculate a remainder trade, $\theta_i$, for each security in the account, i.e. in SECURITY_SET. A remainder trade is an amount of each security in the portfolio that could be traded to consume or raise cash. Once a set of these trades have been calculated, one or more of the trades in this set will be selected, in seriatim, to consume or raise as much cash as needed to make the cash balance in the account, on a proportionate basis, positive but less than the cash maintenance proportion, z,903.

Specifically, upon entry into this loop, execution proceeds to block 1020 to select the next successive security in SECURITY_SET, i.e. SECURITY(i). Once this has occurred, execution proceeds to block 1025 to calculate a remainder trade for this particular security. This remainder trade, $\theta_i$, is initially calculated as the target proportion for this security, $\pi_i$, multiplied by the account value, $V$, less the current share price, $\rho_i$, of this security multiplied by the number of shares, $\sigma_i$, held in this security. This remainder trade will be set to zero if any of the following conditions is satisfied for this security: (a) the number of shares that has just been calculated to be traded, $\epsilon_i$, is non-zero; (b) the current proportion is less than the target proportion and the share price is below the minimum buying price; or (c) it is proscribed or is posted or already has a trade pending therefor.

Once block 1025 has completely executed to generate an appropriate remainder trade for SECURITY(i), decision block 1030 executes to determine whether all securities in the set have been selected, i.e. whether the current value of index variable i equals the value of variable m. If a security in this set remains to be selected, then decision block 1030 routes execution, via NO path 1032, to block 1035. This latter block increments the current value of index variable i by one in order to point to a next successive security in the set. Execution then loops back, via path 1038, to block 1020 to appropriately process that security, and so forth. Alternatively, if all the securities in the set have been so processed, then execution proceeds to decision block 1040, via YES path 1034 emanating from decision block 1030.

At this point, execution enters a loop containing blocks 1040, 1045, 1050, 1055, 1060 and 1065 to select the largest remainder trade(s), in seriatim, to, e.g., consume all the excess cash, i.e. until the cash balance falls within the cash maintenance proportion, $C$, multiplied by the account value.

In particular, within this loop, execution first proceeds to decision block 1040 to test whether the cash balance, K, is negative or exceeds the cash maintenance proportion, $C$, multiplied by the account value. If the cash balance is positive but less than this maintenance proportion multiplied by the account value, then no further trades need to be issued to consume cash. Accordingly, execution exits from routine 1000, via NO path 1042 emanating from decision block 1040. Alternatively, if the current cash balance, K, as a result of a prior iteration through this loop, is negative or greater than the cash maintenance proportion, $C$, multiplied by the account value, then decision block 1040 routes execution, via YES path 1044, to block 1045. This latter block determines the amount of excess portfolio cash, D, that needs to be consumed or raised (in the event this parameter is negative). Excess cash is simply determined as being the current cash balance, K, in the account less the cash maintenance proportion, $C$, multiplied by the current value of the account, $V$. Once this determination is made, execution proceeds to block 1050 to select the particular remainder trade to issue as a trade from the set of remainder trades that has just been determined. If the excess cash is positive, then the particular remainder trade that is selected from the set is that which involves the largest security purchase, in monetary terms. Else, if the excess cash balance is negative, indicating that cash needs to be raised, then the particular remainder trade that is selected from the set of remainder trades is that which involves the largest sale, again in monetary terms. The amount of the resulting selected remainder trade, denoted $\theta_k$, is then adjusted through execution of block 1055. In particular, in the event this remainder trade would consume more than the excess cash, then this block reduces this remainder trade to consume just this amount of cash. Thereafter, execution proceeds to block 1060 to determine the number of shares to be traded through this particular remainder trade. This number, $\epsilon_k$, is initially calculated through equation (9) as follows:

$$\epsilon_k = 100 \, Int\left(\frac{\theta_k}{100 p_k}\right) \tag{9}$$

Once this number is determined, then the remainder trade for this security, i.e. $\theta_k$, is set equal to zero to eliminate any remainder trade for this security from further selection. Thereafter, if the remainder trade, when combined with the number of shares currently in this security, would result in a short sale, i.e. the remainder trade involves a sale of more shares than currently held in this security, i.e. $\sigma_i$, then the number of shares to be sold through this particular remainder trade, i.e. $\epsilon_k$, is reduced to the number of shares currently held. The trade type for this trade, $v_k$, is set to "C" to reflect this trade as a cash control trade. Once block 1060 has fully executed to complete the generation of the appropriate remainder trade, then execution proceeds to block 1065 to update the portfolio value and cash balance to reflect this remainder trade. Specifically, block 1065 updates the cash balance by first calculating the total cost, $\gamma$, associated with the current trade. This cost is illustratively calculated as being the assumed trading cost ($0.15/share) multiplied by the number of shares to be traded. As noted above in connection with block 945, other cost metrics, such as a flat or sliding fee, can be used instead, if and when appropriate. In any event, once the trade cost is determined through block 1065, this block then updates the current cash balance, K, as simply the prior cash balance less number of shares to be traded multiplied by their price per share less the trade cost. Lastly, the portfolio value, $V$, is updated by simply subtracting the trade cost, $\gamma$, and the remainder trade is inserted into the trading list. Once this occurs, execution loops back, via path 1068, to decision block 1040 to determine whether any further remainder trades need to be selected, and so forth.

Figure 11:
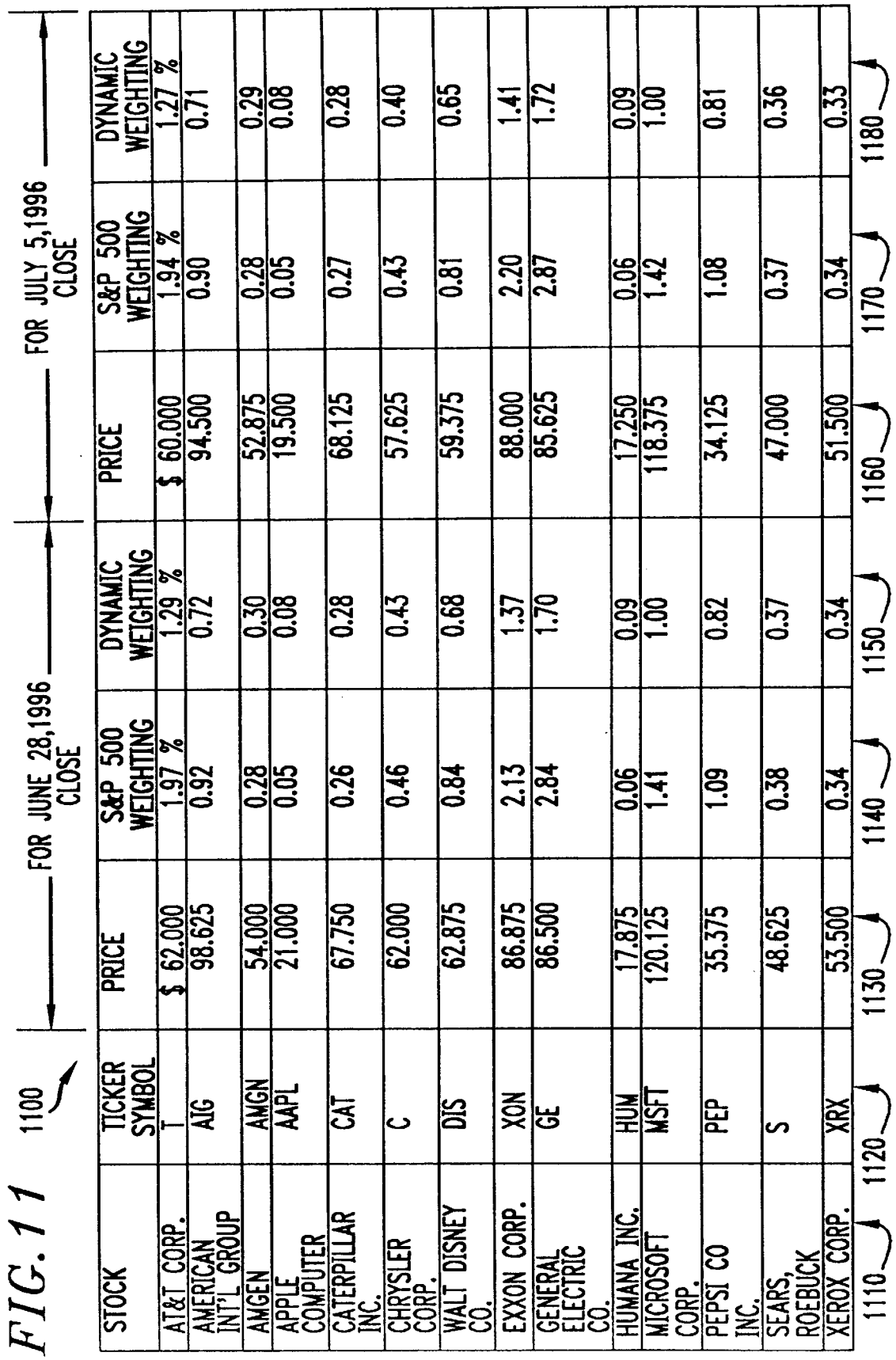
FIG. 11 depicts table 1100 which provides, for purposes of comparison, abbreviated S & P 500 data and simulated corresponding numerical data, the latter generated through use of my present invention using S & P 500 data at two exemplary successive weekly dates.

FIG. 11 depicts table 1100 which provides, for purposes of comparison, abbreviated S & P 500 data and simulated corresponding numerical data, the latter generated through use of my present invention using S & P 500 data at two exemplary successive dates spaced apart by one week: the close of the market on Jun. 28, 1996 and on Jul. 5, 1996. Though the preferred embodiment manages holdings in all 500 securities on the S & P 500 index (with exception of those that are proscribed, as discussed above), for purposes of simplified illustration, this figure merely shows tabular data for 14 well-known and large corporations in the S & P 500 index.

Column 1110 provides the security name, with the ticker symbol for each corresponding security listed in column 1120. For Jun. 28, 1996 and Jul. 5, 1996, columns 1130 and 1160, respectively, list the closing market share prices for each of these securities. The S & P 500 capitalization weightings for each of these securities as it existed on Jun. 28, 1996 and on Jul. 5, 1996 are listed in columns 1140 and 1170. Lastly, columns 1150 and 1180 provide the weightings for each of these securities as determined for each of these two dates through my inventive dynamic rebalancing methodology, as discussed above with specific reference to FIGS. 6A–10B. Changes can be readily seen in both the S & P 500 weightings and in my corresponding dynamic rebalancing weightings determined for the closing share prices on these two dates.

Furthermore, for comparative performance over a relatively long perspective and as noted above, I have found, through empirical analysis, that setting the value of diversity exponent p equal to 0.76 produces a portfolio that consistently yields, over a simulated 16 year test interval an annual return that exceeds that of the S & P 500 index by approximately 40–50 basis points (bp).

In particular, to assess the relative performance of my inventive methodology, I have simulated the performance of that methodology with 16 years of actual market data, from 1979 to 1995, and have compared the results to two other major market indices, namely the S & P 500 index and the Russell 1000 index. The latter is similar to the S & P 500 index with the difference being that Russell 1000 index contains the top 1000, rather than 500, securities in terms of market capitalization—hence being more weighted to securities with relatively low market capitalizations. I have chosen to start with 1979 market data inasmuch as that year coincides with the inception of the Russell 1000 index.

Figures 12, 13:
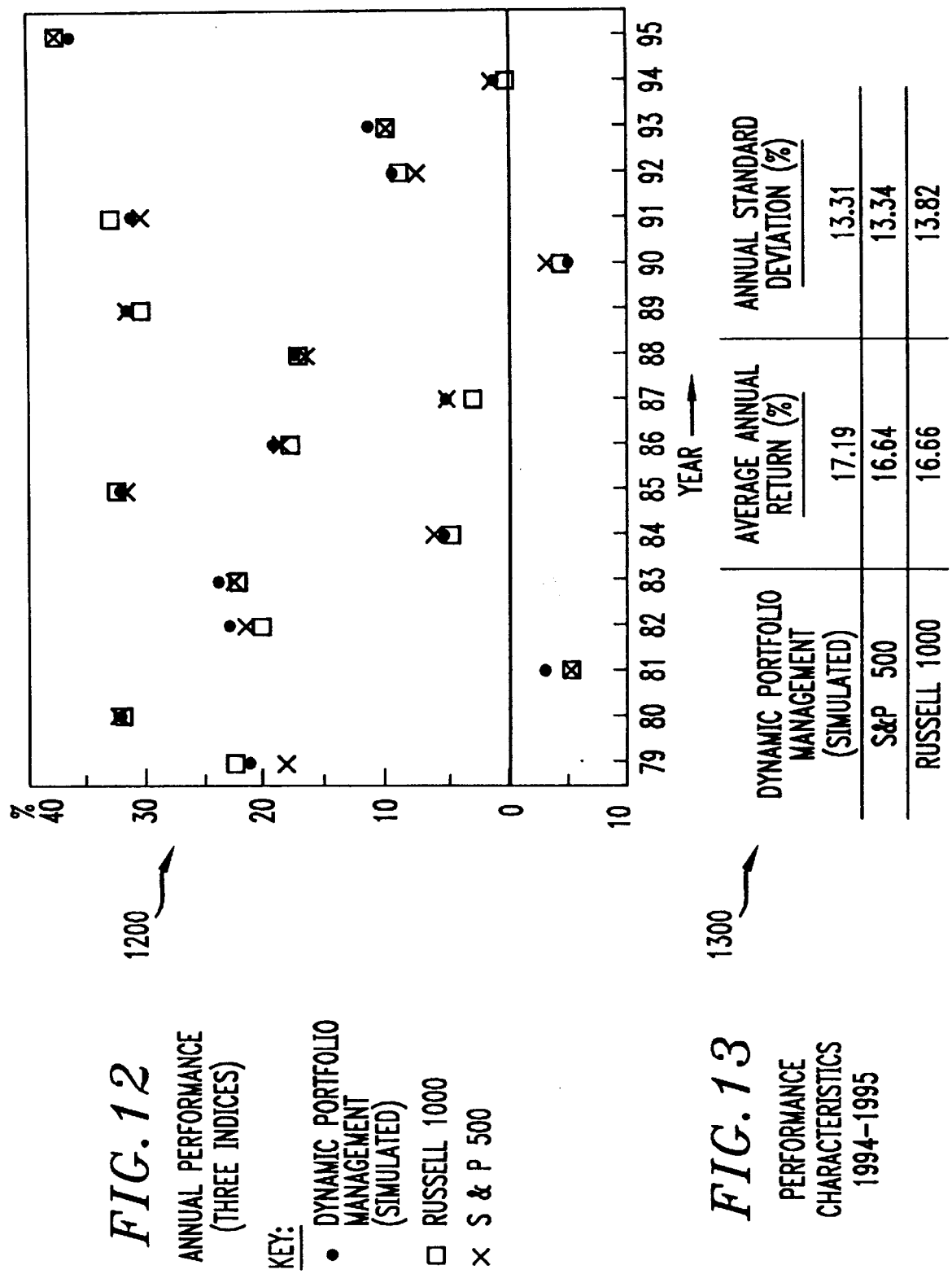
FIG. 12 depicts, in graphical form, simulated performance data for my present invention, along with actual performance data for the S & P 500 and Russell 1000 indices for the period 1979–1995.
FIG. 13 depicts, in tabular form, annualized simulated performance data for my present invention, along with annualized actual performance data for the S & P 500 and Russell 1000 indices for the period 1979–1995.

FIG. 12 depicts, in graphical form, resulting simulated performance data for my present invention, along with actual performance data for the S & P 500 and Russell 1000 indices for the period 1979–1995, with corresponding annualized returns and associated standard deviation being shown in tabular form in FIG. 13. As can be seen, the simulated performance of my dynamic rebalancing methodology would have consistently tracked both the S & P 500 and Russell 1000 indices over this 16 year period and would have generated an annual return which advantageously exceeded that of both indices by approximately 40–50 bp and with less variability than that associated with either of these two indices.

Clearly those skilled in the art realize that the present invention can be simultaneously employed to dynamically rebalance equity holdings in an index fund reflective of several different, e.g., national based, capitalization weighted indices, one of which can illustratively be the S & P 500 index as discussed above with others for, e.g., different countries or regions. The weighting of each individual security that constitutes any one of the indices would be dynamically changed as needed, independent of each of those that constitute any of the other indices, as a result of a non-constant function of current capitalization weightings of that one index. These separate national (or regional) indices can then be combined to form a single international index, with each national (or regional) index being separately managed in the manner taught by the present invention.

Furthermore, the present invention can be utilized in conjunction with an international index that uses financial derivatives to, e.g., replicate or even improve the returns of the underlying national indices. Inasmuch as so-called "swap" contracts may have a favorable tax treatment in some countries over owning the underlying equity securities, these (and/or other related forms of) derivatives could be held in the same weights as would the corresponding equity securities. Similarly, so-called "futures" and certain options could be held and managed in lieu of corresponding equity securities. In addition, hybrid strategies combining equities, derivatives, futures and/or options in some manner can be utilized with their management, within an index fund, occurring in accordance with my present invention.

Specifically, the present invention can be utilized in conjunction with "put" and "call" options. Here, once an appropriate weight has been calculated for each security in an index fund, transaction orders, such as for the purchase or sale of common stock (as described above in the context of the preferred embodiment), are issued, as needed, to properly rebalance the entire portfolio to reflect all the new weightings. In lieu of purchasing or selling just shares of common stock, the order, in lieu thereof or additionally, could involve the purchase or sale of options, e.g. puts or calls, on that stock. Such options would be financially equivalent to all or a portion of the number of shares of the underlying common stock to be traded, as determined through dynamic rebalancing. Inasmuch as the value of such options dynamically changes their share equivalence as the price of the underlying stock changes, these variations could be exploited to assist in dynamically rebalancing the portfolio. Nevertheless, at a moment a trade is executed, the share equivalent of the mixture of stock shares and options would match the number of shares in a pure stock transaction.

In addition, foreign equities trade on various United States exchanges through so-called "American Depository Receipts" (ADRs) each of which represents ownership, in some fraction, of a share of an underlying foreign common stock. Inasmuch as it is easier and often less expensive, from a transaction cost perspective, to trade in ADRs through a US exchange than in shares of the corresponding foreign stock through a foreign exchange, ADRs or some form of financial instrument, such as derivative(s), futures or options, based thereon, which are financially equivalent to actual shares of common stock, could be substituted as all or part of a transaction originally denominated in shares of the foreign stock.

Although a single embodiment, in terms of apparatus and methods, which incorporates the teachings of the present invention, as well as various modifications and extensions thereof, has been shown and described in detail herein, those skilled in the art can readily devise many other varied embodiments, modifications and/or extensions that still incorporate these teachings.

I claim:

1. Apparatus for managing a portfolio having a set of financial securities, wherein said set comprises a plurality of said securities contained as members within a predetermined capitalization weighted index, said apparatus comprising:

circuitry, responsive to signals containing data having current price information on each of said securities and on constituent securities currently contained within said index, for providing digital data containing the price information and containing share information for each of the constituent securities that currently forms the index; and a computer system, the computer system having a processor and a memory, the memory storing computer executable instructions therein, wherein the processor in response to the executable instructions and to said digital data:

determines a variable weighting for each of the securities in the set so as to define a set of variable weights, distinct from a set of current capitalization weights associated with the index, such that each of the variable weights is a non-constant mathematical function of solely the current capitalization weights; and issues, in response to the set of variable weights, digital trading instructions which are in turn executed to effectuate securities transactions such that current assets held in the portfolio are to be distributed amongst the securities in the set in proportion to and as defined by the variable weights so as to dynamically rebalance the portfolio, each of said digital trading instructions representing a desired trade in a corresponding one of the securities in the set thereby defining a plurality of trades to be executed.

2. The apparatus in claim 1 wherein said each of the variable weights, $V_i$ (for i=1, 2, . . . n), is given by the following equation:

$$V_i = \left( \frac{D_i S(W_1, W_2, \ldots, W_n)}{S(W_1, W_2, \ldots, W_n)} + 1 - \sum_{j=1}^{n} \frac{W_j D_j S(W_1, W_2, \ldots, W_n)}{S(W_1, W_2, \ldots, W_n)} \right) W_i$$

wherein: $W_1, W_2, \ldots, W_n$ are the current capitalization weights for securities in the set;

$D_i$ and $D_j$ are partial derivative operators with respect to $i^{th}$ and $j^{th}$ ones of the current capitalization weights, respectively;

S is a twice continuously differentiable function;

and n is a number of securities in the set.

3. The apparatus in claim 2 wherein the computer system has computer executable instructions for selectively operating in either a rebalancing or cash investment mode, during the rebalancing mode said variable weights are determined and, in response thereto, said digital trading instructions are issued so as to dynamically rebalance the portfolio, and during the cash investment mode at least one other digital trading trading instruction is issued so as to consume an amount of cash then existing in the portfolio that exceeds a predefined threshold.

4. The apparatus in claim 3 wherein the rebalancing mode is invoked at periodic intervals and the cash investment mode is invoked selectively whenever the cash in the portfolio exceeds the predefined threshold.

5. The apparatus in claim 3 wherein the computer system has computer executable instructions for, during operation in said cash investment mode:

generating a list of possible trades for each security in the set;

selecting one of the possible trades that consumes, amongst all of the possible trades, a largest amount of the cash;

issuing an electronic instruction, to an electronic trading network, containing said selected one trade so as to execute said one possible trade; and removing said selected one trade from said list and repeating said selecting, issuing and removing operations, in seriatim, to generate additional trades for execution until said cash decreases below said predefined threshold.

6. The apparatus in claim 2 wherein the computer system has computer executable instructions for:

determining, in response to the share information and to the current price information for each of the securities in the index, a normalized current capitalization weighting for each of said securities in the index;

determining, in response to said normalized capitalization weighting, the variable weighting for each security in the set;

ascertaining a current proportion for each of said securities in the set, said current proportion being reflective of a proportion of a total value of the portfolio attributable to said each security in the set; and generating, in response to a predefined relationship between said variable weighting and said current weighting, for each corresponding one of the securities in the set, a corresponding one of the digital trading instructions, the corresponding one digital trading instruction representing an associated trade involving said corresponding one security such that a proportion of the portfolio that will be held in said one security, after said associated trade is executed, will approximate the variable weighting determined for said one security.

7. The apparatus in claim 6 wherein the computer system has computer executable instructions for:

calculating a number of shares in said one security to be traded;

rounding said number to a round lot of shares so as to form a rounded share number; and incorporating said rounded share number within the corresponding one digital trading instruction.

8. The apparatus in claim 2 wherein the share information comprises an identifier of each of said securities in the index and a number of shares currently outstanding for said each security.

9. The apparatus in claim 2 wherein said circuitry comprises first and second data sources for providing first and second digital data streams, respectively, wherein:

said first data source comprises a satellite receiver, a radio or television receiver, or a telephonic or dedicated connection, through a computer network, to a remote server; and said second data source comprises a radio or television receiver, or a telephonic or dedicated connection, through a computer network, to a remote server.

10. The apparatus in claim 9 wherein said first data source further comprises a satellite receiver, connected to a satellite antenna, for receiving terrestrially broadcast signals distributed by satellite and containing said current price information, for producing a received signal and forming, in response to the received signal, the first digital data stream containing said price information.

11. The apparatus in claim 2 wherein the capitalization weighted index is the S & P 500, Financial Times Stock Exchange 100, TOPIX or Russell 1000 stock index.

12. The apparatus in claim 2 wherein the function S is given by the following equation:

$$S(W_1, W_2, \ldots, W_n) = - \sum_{i=1}^{n} W_i \ln W_i.$$

13. The apparatus in claim 12 wherein the computer system has computer executable instructions for selectively operating in either a rebalancing or cash investment mode, during the rebalancing mode said variable weights are determined and, in response thereto, said digital trading instructions are issued so as to dynamically rebalance the portfolio, and during the cash investment mode at least one other digital trading instruction is issued so as to consume an amount of cash then existing in the portfolio that exceeds a predefined threshold.

14. The apparatus in claim 13 wherein the rebalancing mode is invoked at periodic intervals and the cash investment mode is invoked selectively whenever the cash in the portfolio exceeds the predefined threshold.

15. The apparatus in claim 13 wherein the computer system has computer executable instructions for, during operation in said cash investment mode:
   generating a list of possible trades for each security in the set;
   selecting one of the possible trades that consumes, amongst all of the possible trades, a largest amount of the cash;
   issuing an electronic instruction, to an electronic trading network, containing said selected one trade so as to execute said one possible trade; and
   removing said selected one trade from said list and repeating said selecting, issuing and removing operations, in seriatim, to generate additional trades for execution until said cash decreases below said predefined threshold.

16. The apparatus in claim 12 wherein the computer system has computer executable instructions for:
   determining, in response to the share information and to the current price information for each of the securities in the index, a normalized current capitalization weighting for each of said securities in the index;
   determining, in response to said normalized capitalization weighting, the variable weighting for each security in the set;
   ascertaining a current proportion for each of said securities in the set, said current proportion being reflective of a proportion of a total value of the portfolio attributable to said each security in the set; and
   generating, in response to a predefined relationship between said variable weighting and said current weighting, for each corresponding one of the securities in the set, a corresponding one of the digital trading instructions, the corresponding one digital trading instruction representing an associated trade involving said corresponding one security such that a proportion of the portfolio that will be held in said one security, after said associated trade is executed, will approximate the variable weighting determined for said one security.

17. The apparatus in claim 16 wherein the computer system has computer executable instructions for:
   calculating a number of shares in said one security to be traded;
   rounding said number to a round lot of shares so as to form a rounded share number; and
   incorporating said rounded share number within the corresponding one digital trading instruction.

18. The apparatus in claim 12 wherein the share information comprises an identifier of each of said securities in the index and a number of shares currently outstanding for said each security.

19. The apparatus in claim 12 wherein said circuitry comprises first and second data sources for providing first and second digital data streams, respectively, wherein:
   said first data source comprises a satellite receiver, a radio or television receiver, or a telephonic or dedicated connection, through a computer network, to a remote server; and
   said second data source comprises a radio or television receiver, or a telephonic or dedicated connection, through a computer network, to a remote server.

20. The apparatus in claim 19 wherein said first data source further comprises a satellite receiver, connected to a satellite antenna, for receiving terrestrially broadcast signals distributed by satellite and containing said current price information, for producing a received signal and forming, in response to the received signal, the first digital data stream containing said price information.

21. The apparatus in claim 12 wherein the capitalization weighted index is the S & P 500, Financial Times Stock Exchange 100, TOPIX or Russell 1000 stock index.

22. The apparatus in claim 2 wherein function S is given by the following equation:

$$S(W_1, W_2, \ldots, W_n) = \left( \sum_{i=1}^{n} W_i^p \right)^{1/p}$$

where: p is a predefined constant.

23. The apparatus in claim 22 wherein the computer system has computer executable instructions for selectively operating in either a rebalancing or cash investment mode, during the rebalancing mode said variable weights are determined and, in response thereto, said digital trading instructions are issued so as to dynamically rebalance the portfolio, and during the cash investment mode at least one other digital trading instruction is issued so as to consume an amount of cash then existing in the portfolio that exceeds a predefined threshold.

24. The apparatus in claim 23 wherein the rebalancing mode is invoked at periodic intervals and the cash investment mode is invoked selectively whenever the cash in the portfolio exceeds the predefined threshold.

25. The apparatus in claim 23 wherein the computer system has computer executable instructions for, during operation in said cash investment mode:
   generating a list of possible trades for each security in the set;
   selecting one of the possible trades that consumes, amongst all of the possible trades, a largest amount of the cash;
   issuing an electronic instruction, to an electronic trading network, containing said selected one trade so as to execute said one possible trade; and
   removing said selected one trade from said list and repeating said selecting, issuing and removing operations, in seriatim, to generate additional trades for execution until said cash decreases below said predefined threshold.

26. The apparatus in claim 22 wherein the computer system has computer executable instructions for:
   determining, in response to the share information and to the current price information for each of the securities in the index, a normalized current capitalization weighting for each of said securities in the index;
   determining, in response to said normalized capitalization weighting, the variable weighting for each security in the set;
   ascertaining a current proportion for each of said securities in the set, said current proportion being reflective of a proportion of a total value of the portfolio attributable to said each security in the set; and
   generating, in response to a predefined relationship between said variable weighting and said current weighting, for each corresponding one of the securities in the set, a corresponding one of the digital trading instructions, the corresponding one digital trading instruction representing an associated trade involving said corresponding one security such that a proportion of the portfolio that will be held in said one security, after said associated trade is executed, will approximate the variable weighting determined for said one security.

27. The apparatus in claim 26 wherein the computer system has computer executable instructions for:
   calculating a number of shares in said one security to be traded;
   rounding said number to a round lot of shares so as to form a rounded share number; and
   incorporating said rounded share number within the corresponding one digital trading instruction.

28. The apparatus in claim 22 wherein the share information comprises an identifier of each of said securities in the index and a number of shares currently outstanding for said each security.

29. The apparatus in claim 22 wherein said circuitry comprises first and second data sources for providing first and second digital data streams, respectively, wherein:
   said first data source comprises a satellite receiver, a radio or television receiver, or a telephonic or dedicated connection, through a computer network, to a remote server; and
   said second data source comprises a radio or television receiver, or a telephonic or dedicated connection, through a computer network, to a remote server.

30. The apparatus in claim 29 wherein said first data source further comprises a satellite receiver, connected to a satellite antenna, for receiving terrestrially broadcast signals distributed by satellite and containing said current price information, for producing a received signal and forming, in response to the received signal, the first digital data stream containing said price information.

31. The apparatus in claim 22 wherein the capitalization weighted index is the S & P 500, Financial Times Stock Exchange 100, TOPIX or Russell 1000 stock index and p has a value of 0.76.

32. The apparatus in claim 1 wherein the computer system has computer executable instructions for selectively operating in either a rebalancing or cash investment mode, during the rebalancing mode said variable weights are determined and, in response thereto, said digital trading instructions are issued so as to dynamically rebalance the portfolio, and during the cash investment mode at least one other digital trading instruction is issued so as to consume an amount of cash then existing in the portfolio that exceeds a predefined threshold.

33. The apparatus in claim 32 wherein the rebalancing mode is invoked at periodic intervals and the cash investment mode is invoked selectively whenever the cash in the portfolio exceeds the predefined threshold.

34. The apparatus in claim 1 wherein the computer system has computer executable instructions for:
   determining, in response to the share information and to the current price information for each of the securities in the index, a normalized current capitalization weighting for each of said securities in the index;
   determining, in response to said normalized capitalization weighting, the variable weighting for each security in the set;
   ascertaining a current proportion for each of said securities in the set, said current proportion being reflective of a proportion of a total value of the portfolio attributable to said each security in the set; and
   generating, in response to a predefined relationship between said variable weighting and said current weighting, for each corresponding one of the securities in the set, a corresponding one of the digital trading instructions, the corresponding one digital trading instruction representing an associated trade involving said corresponding one security such that a proportion of the portfolio that will be held in said one security, after said associated trade is executed, will approximate the variable weighting determined for said one security.

35. The apparatus in claim 34 wherein the computer system has computer executable instructions for:
   calculating a number of shares in said one security to be traded;
   rounding said number to a round lot of shares so as to form a rounded share number; and
   incorporating said rounded share number within the corresponding one digital trading instruction.

36. The apparatus in claim 1 wherein the computer system has computer executable instructions for:
   generating a list of possible trades for each security in the set;
   selecting one of the possible trades that consumes, amongst all of the possible trades, a largest amount of the cash;
   issuing an electronic instruction, to an electronic trading network, containing said selected one trade so as to execute said one possible trade; and
   removing said selected one trade from said list and repeating said selecting, issuing and removing operations, in seriatim, to generate additional trades for execution until said cash decreases below said predefined threshold.

37. The apparatus in claim 1 wherein the share information comprises an identifier of each of said securities in the index and a number of shares currently outstanding for said each security.

38. The apparatus in claim 1 wherein said circuitry comprises first and second data sources for providing first and second digital data streams, respectively, wherein:
   said first data source comprises a satellite receiver, a radio or television receiver, or a telephonic or dedicated connection, through a computer network, to a remote server; and
   said second data source comprises a radio or television receiver, or a telephonic or dedicated connection, through a computer network, to a remote server.

39. The apparatus in claim 38 wherein said first data source further comprises a satellite receiver, connected to a satellite antenna, for receiving terrestrially broadcast signals distributed by satellite and containing said current price information, for producing a received signal and forming, in response to the received signal, the first digital data stream containing said price information.

40. The apparatus in claim 1 wherein the capitalization weighted index is the S & P 500, Financial Times Stock Exchange 100, TOPIX or Russell 1000 stock index.

41. A method for managing a portfolio having a set of financial securities, wherein said set comprises a plurality of said securities contained as members within a predetermined capitalization weighted index, said method comprising the steps of:
   providing, in response to signals containing data having current price information on each of said securities and on constituent securities currently contained within said index, digital data containing the price information and containing share information for each of the constituent securities that currently forms the index; and in a computer system having a processor and a memory, the memory storing computer executable instructions therein, wherein the method further comprises the steps, in response to the stored instructions and the digital data, of, in the processor:

determining a variable weighting for each of the securities in the set so as to define a set of variable weights, distinct from a set of current capitalization weights associated with the index, such that each of the variable weights is a non-constant mathematical function of solely the current capitalization weights issuing, in response to the set of variable weights, digital trading instructions such that current assets held in the portfolio are to be distributed amongst the securities in the set in proportion to and as defined by the variable weights so as to dynamically rebalance the portfolio, each of said digital trading instructions representing a desired trade in a corresponding one of the securities in the set thereby defining a plurality of trades to be executed; and executing each of said digital trading instructions so as to effectuate the trades.

42. The method in claim 41 wherein said each of the variable weights, $V_i$ (for i=1, 2, . . . n), is given by the following equation:

$$V_i = \left( \frac{D_i S(W_1, W_2, \ldots, W_n)}{S(W_1, W_2, \ldots, W_n)} + 1 - \sum_{j=1}^{n} \frac{W_j D_j S(W_1, W_2, \ldots, W_n)}{S(W_1, W_2, \ldots, W_n)} \right) W_i$$

wherein: $W_1, W_2, \ldots, W_n$ are the current capitalization weights for securities in the set;

$D_i$ and $D_j$ are partial derivative operators with respect to $i^{th}$ and $j^{th}$ ones of the current capitalization weights;

S is a twice continuously differentiable function; and n is a number of securities in the set.

43. The method in claim 42 further comprising the steps, in the computer system, of selectively operating in either a rebalancing or cash investment mode, wherein during the rebalancing mode:
  determining said variable weights and,
  issuing, in response to said variable weights, said digital trading instructions so as to dynamically rebalance the portfolio, and during the cash investment mode:
  issuing at least one other digital trading instruction so as to consume an amount of cash then existing in the portfolio that exceeds a predefined threshold.

44. The method in claim 43 further comprising the steps, in the computer system, of:

invoking the rebalancing mode at periodic intervals; and invoking the cash investment mode selectively whenever the cash in the portfolio exceeds the predefined threshold.

45. The method in claim 43 further comprising the steps, in the computer system during said cash investment mode, of:

generating a list of possible trades for each security in the set;

selecting one of the possible trades that consumes, amongst all of the possible trades, a largest amount of the cash;

issuing an electronic instruction, to an electronic trading network, containing said selected one trade so as to execute said one possible trade; and removing said selected one trade from said list and repeating said selecting, issuing and removing operations, in seriatim, to generate additional trades for execution until said cash decreases below said predefined threshold.

46. The method in claim 42 further comprising the steps, in the computer system of:

determining, in response to the share information and to the current price information for each of the securities in the index, a normalized current capitalization weighting for each of said securities in the index;

determining, in response to said normalized capitalization weighting, the variable weighting for each security in the set;

ascertaining a current proportion for each of said securities in the set, said current proportion being reflective of a proportion of a total value of the portfolio attributable to said each security in the set; and generating, in response to a predefined relationship between said variable weighting and said current weighting, for each corresponding one of the securities in the set, a corresponding one of the digital trading instructions, the corresponding one digital trading instruction representing an associated trade involving said corresponding one security such that a proportion of the portfolio that will be held in said one security, after said associated trade is executed, will approximate the variable weighting determined for said one security.

47. The method in claim 46 further comprising the steps, in the computer system during said instruction generating step and during said rebalancing mode, of:

calculating a number of shares in said one security to be traded;

rounding said number to a round lot of shares so as to form a rounded share number; and incorporating said rounded share number within the corresponding one digital trading instruction.

48. The method in claim 42 wherein the share information comprises an identifier of each of said securities in the index and a number of shares currently outstanding for said each security.

49. The method in claim 42 wherein the capitalization weighted index is the S & P 500, Financial Times Stock Exchange 100, TOPIX or Russell 1000 stock index.

50. The method in claim 42 wherein the function S is given by the following equation:

$$S(W_1, W_2, \ldots, W_n) = -\sum_{i=1}^{n} W_i \ln W_i.$$

51. The method in claim 50 further comprising the steps, in the computer system, of selectively operating in either a rebalancing or cash investment mode, wherein during the rebalancing mode:
  determining said variable weights and,
  issuing, in response to said variable weights, said digital trading instructions so as to dynamically rebalance the portfolio, and during the cash investment mode:
  issuing at least one other digital trading instruction so as to consumes an amount of cash then existing in the portfolio that exceeds a predefined threshold.

52. The method in claim 51 further comprising the steps, in the computer system, of:

invoking the rebalancing mode at periodic intervals; and invoking the cash investment mode selectively whenever the cash in the portfolio exceeds the predefined threshold.

53. The method in claim 51 further comprising the steps, in the computer system during said cash investment mode, of:

generating a list of possible trades for each security in the set;

selecting one of the possible trades that consumes, amongst all of the possible trades, a largest amount of the cash;

issuing an electronic instruction, to an electronic trading network, containing said selected one trade so as to execute said one possible trade; and removing said selected one trade from said list and repeating said selecting, issuing and removing operations, in seriatim, to generate additional trades for execution until said cash decreases below said predefined threshold.

54. The method in claim 50 further comprising the steps, in the computer system of:

determining, in response to the share information and to the current price information for each of the securities in the index, a normalized current capitalization weighting for each of said securities in the index;

determining, in response to said normalized capitalization weighting, the variable weighting for each security in the set;

ascertaining a current proportion for each of said securities in the set, said current proportion being reflective of a proportion of a total value of the portfolio attributable to said each security in the set; and generating, in response to a predefined relationship between said variable weighting and said current weighting, for each corresponding one of the securities in the set, a corresponding one of the digital trading instructions, the corresponding one digital trading instruction representing an associated trade involving said corresponding one security such that a proportion of the portfolio that will be held in said one security, after said associated trade is executed, will approximate the variable weighting determined for said one security.

55. The method in claim 54 further comprising the steps, in the computer system during said instruction generating step and during said rebalancing mode, of:

calculating a number of shares in said one security to be traded;

rounding said number to a round lot of shares so as to form a rounded share number; and incorporating said rounded share number within the corresponding one digital trading instruction.

56. The method in claim 50 wherein the share information comprises an identifier of each of said securities in the index and a number of shares currently outstanding for said each security.

57. The method in claim 50 wherein the capitalization weighted index is the S & P 500, Financial Times Stock Exchange 100, TOPIX or Russell 1000 stock index.

58. The method in claim 42 wherein function S is given by the following equation:

$$S(W_1, W_2, \ldots, W_n) = \left( \sum_{i=1}^{n} W_i^p \right)^{1/p}$$

where: p is a predefined constant.

59. The method in claim 58 further comprising the steps, in the computer system, of selectively operating in either a rebalancing or cash investment mode, wherein during the rebalancing mode:
determining said variable weights and,
issuing, in response to said variable weights, said digital trading instructions so as to dynamically rebalance the portfolio, and during the cash investment mode:
issuing at least one other digital trading instruction so as to consume an amount of cash then existing in the portfolio that exceeds a predefined threshold.

60. The method in claim 59 further comprising the steps, in the computer system during said cash investment mode, of:

generating a list of possible trades for each security in the set;

selecting one of the possible trades that consumes, amongst all of the possible trades, a largest amount of the cash;

issuing an electronic instruction, to an electronic trading network, containing said selected one trade so as to execute said one possible trade; and removing said selected one trade from said list and repeating said selecting, issuing and removing operations, in seriatim, to generate additional trades for execution until said cash decreases below said predefined threshold.

61. The method in claim 58 further comprising the steps, in the computer system, of:

invoking the rebalancing mode at periodic intervals; and invoking the cash investment mode selectively whenever the cash in the portfolio exceeds the predefined threshold.

62. The method in claim 58 further comprising the steps, in the computer system of:

determining, in response to the share information and to the current price information for each of the securities in the index, a normalized current capitalization weighting for each of said securities in the index;

determining, in response to said normalized capitalization weighting, the variable weighting for each security in the set;

ascertaining a current proportion for each of said securities in the set, said current proportion being reflective of a proportion of a total value of the portfolio attributable to said each security in the set; and generating, in response to a predefined relationship between said variable weighting and said current weighting, for each corresponding one of the securities in the set, a corresponding one of the digital trading instructions, the corresponding one digital trading instruction representing an associated trade involving said corresponding one security such that a proportion of the portfolio that will be held in said one security, after said associated trade is executed, will approximate the variable weighting determined for said one security.

63. The method in claim 62 further comprising the steps, in the computer system during said instruction generating step and during said rebalancing mode, of:

calculating a number of shares in said one security to be traded;

rounding said number to a round lot of shares so as to form a rounded share number; and incorporating said rounded share number within the corresponding one digital trading instruction.

64. The method in claim 58 wherein the share information comprises an identifier of each of said securities in the index and a number of shares currently outstanding for said each security.

65. The method in claim 58 wherein the capitalization weighted index is the S & P 500, Financial Times Stock Exchange 100, TOPIX or Russell 1000 stock indices and p has a value of 0.76.

66. The method in claim 41 further comprising the steps, in the computer system, of selectively operating in either a rebalancing or cash investment mode, wherein during the rebalancing mode:
    determining said variable weights and,
    issuing, in response to said variable weights, said digital trading instructions so as to dynamically rebalance the portfolio, and during the cash investment mode:
    issuing at least one other digital trading instruction so as to consume an amount of cash then existing in the portfolio that exceeds a predefined threshold.

67. The method in claim 66 further comprising the steps, in the computer system, of:

invoking the rebalancing mode at periodic intervals; and invoking the cash investment mode selectively whenever the cash in the portfolio exceeds the predefined threshold.

68. The method in claim 66 further comprising the steps, in the computer system during said cash investment mode, of:

generating a list of possible trades for each security in the set;

selecting one of the possible trades that consumes, amongst all of the possible trades, a largest amount of the cash;

issuing an electronic instruction, to an electronic trading network, containing said selected one trade so as to execute said one possible trade; and removing said selected one trade from said list and repeating said selecting, issuing and removing operations, in seriatim, to generate additional trades for execution until said cash decreases below said predefined threshold.

69. The method in claim 41 further comprising the steps, in the computer system of:

determining, in response to the share information and to the current price information for each of the securities in the index, a normalized current capitalization weighting for each of said securities in the index;

determining, in response to said normalized capitalization weighting, the variable weighting for each security in the set;

ascertaining a current proportion for each of said securities in the set, said current proportion being reflective of a proportion of a total value of the portfolio attributable to said each security in the set; and generating, in response to a predefined relationship between said variable weighting and said current weighting, for each corresponding one of the securities in the set, a corresponding one of the digital trading instructions, the corresponding one digital trading instruction representing an associated trade involving said corresponding one security such that a proportion of the portfolio that will be held in said one security, after said associated trade is executed, will approximate the variable weighting determined for said one security.

70. The method in claim 69 further comprising the steps, in the computer system during said instruction generating step of:

calculating a number of shares in said one security to be traded;

rounding said number to a round lot of shares so as to form a rounded share number; and incorporating said rounded share number within the corresponding one digital trading instruction.

71. The method in claim 41 wherein the share information comprises an identifier of each of said securities in the index and a number of shares currently outstanding for said each security.

72. The method in claim 41 wherein the capitalization weighted index is the S & P 500, Financial Times Stock Exchange 100, TOPIX or Russell 1000 stock index.

* * * * *